(12) United States Patent
Fujimori et al.

(10) Patent No.: US 6,364,492 B1
(45) Date of Patent: Apr. 2, 2002

(54) PROJECTOR

(75) Inventors: Motoyuki Fujimori; Akitoshi Kuroda; Shinji Haba; Kiyoshi Miyashita; Takeshi Takizawa; Mutsuya Furuhata, all of Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/077,826

(22) PCT Filed: Oct. 3, 1997

(86) PCT No.: PCT/JP97/03558

§ 371 Date: Jun. 4, 1998

§ 102(e) Date: Jun. 4, 1998

(87) PCT Pub. No.: WO98/14829

PCT Pub. Date: Apr. 9, 1998

(30) Foreign Application Priority Data

Oct. 4, 1996 (JP) ............................ 8-264951
Oct. 28, 1996 (JP) ............................ 8-285690
Sep. 24, 1997 (JP) ............................ 9-259018
Oct. 1, 1997 (JP) ............................ 9-269069

(51) Int. Cl.⁷ ............................................. G03B 21/14
(52) U.S. Cl. ........................................ 353/119; 353/57
(58) Field of Search ........................... 353/52, 57, 58, 353/60, 61, 119

(56) References Cited

U.S. PATENT DOCUMENTS 3,920,323 A * 11/1975 Nishitani ...................... 353/61
4,829,327 A * 5/1989 Grunwald ..................... 353/57
5,136,397 A * 8/1992 Miyashita .................... 353/57
5,651,599 A * 7/1997 Fujimori ....................... 353/61
5,806,952 A * 9/1998 Fujimori ....................... 353/57
5,842,761 A * 12/1998 Futakami et al. ............. 353/57
5,951,136 A * 9/1999 Furuhata et al. .............. 353/61

FOREIGN PATENT DOCUMENTS

| JP | U-64-23037 | 2/1989 |
| JP | A-1-302387 | 12/1989 |
| JP | A-4-271334 | 9/1992 |
| JP | A-5-135745 | 6/1993 |
| JP | U-5-64826 | 8/1993 |
| JP | A-7-168160 | 7/1995 |
| JP | A-7-295097 | 11/1995 |
| JP | A-7-333571 | 12/1995 |
| JP | A-8-68978 | 3/1996 |
| JP | A-9-265132 | 10/1997 |
| WO | WO96/20424 | 7/1996 |

* cited by examiner

Primary Examiner—William Dowling
(74) Attorney, Agent, or Firm—Oliff & Berridge, PLC

(57) ABSTRACT

In a projection display provided with an optical unit, a power source unit, an external case to store the optical unit and the power source unit, a suction opening (75) is formed in one end part of the power source unit, a discharge opening (77) is formed in the other end part, and the suction opening (75) is arranged in the vicinity of an air inlet in the external case. Because the suction opening (75) and the discharge opening (77) are provided, the inside of the power source unit can be independently and efficiently cooled, and the optical unit and the power source unit can be arranged closely to each other.

4 Claims, 14 Drawing Sheets

[FIG. 1]
(A)
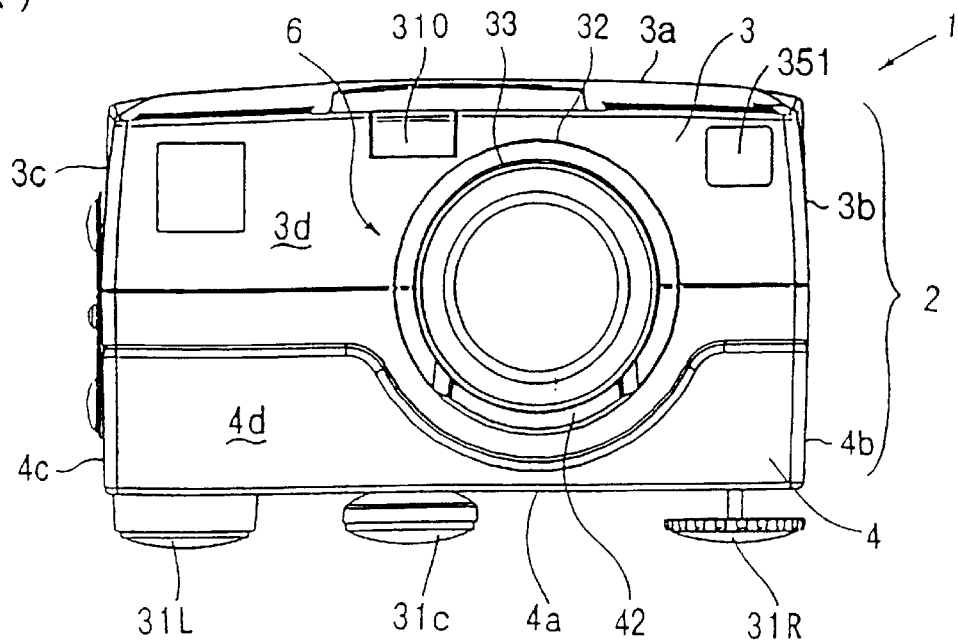
(B)
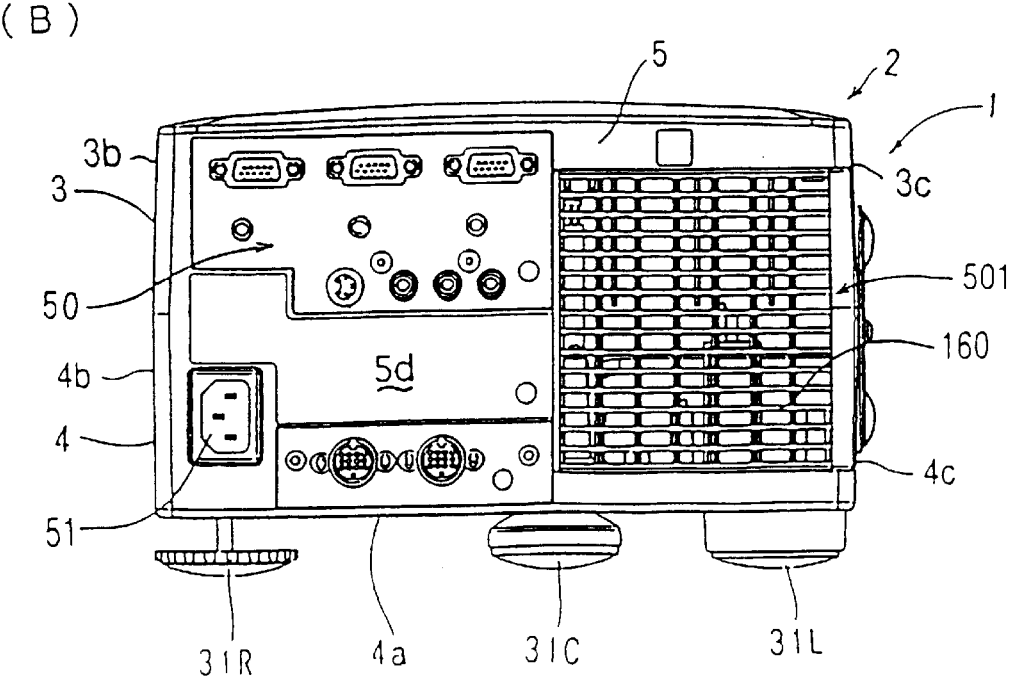

[FIG. 2]
(A)
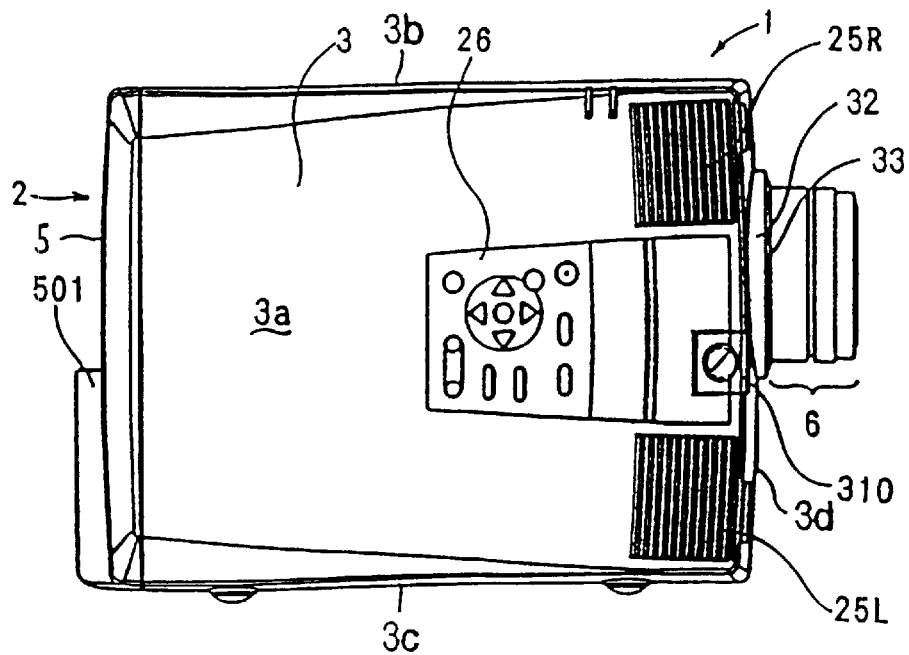
(B)
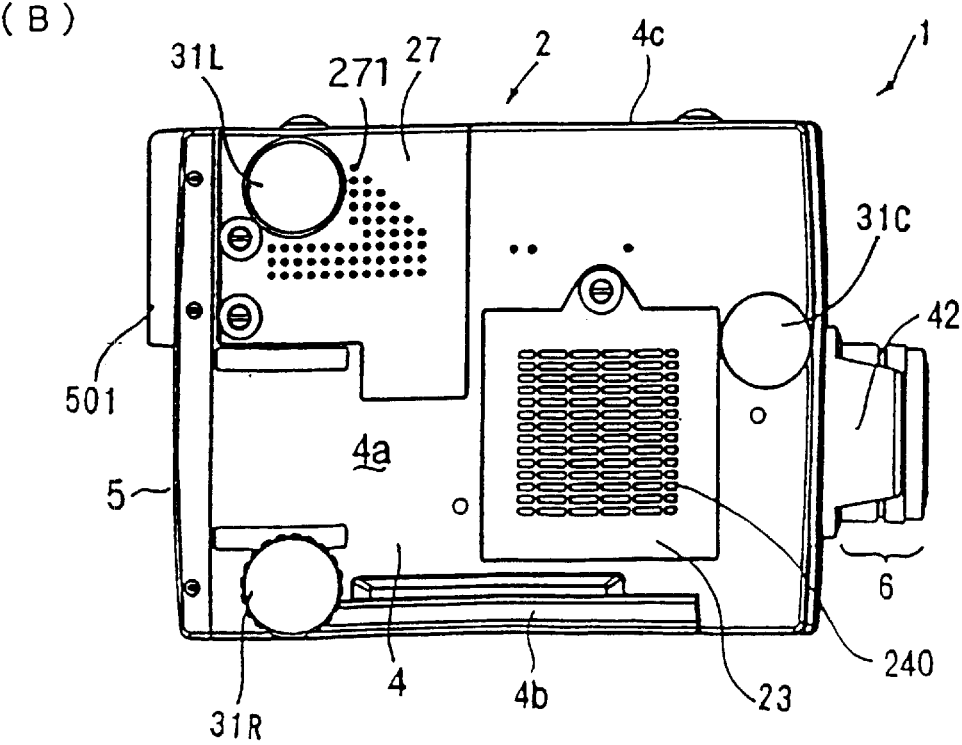

[FIG. 3]
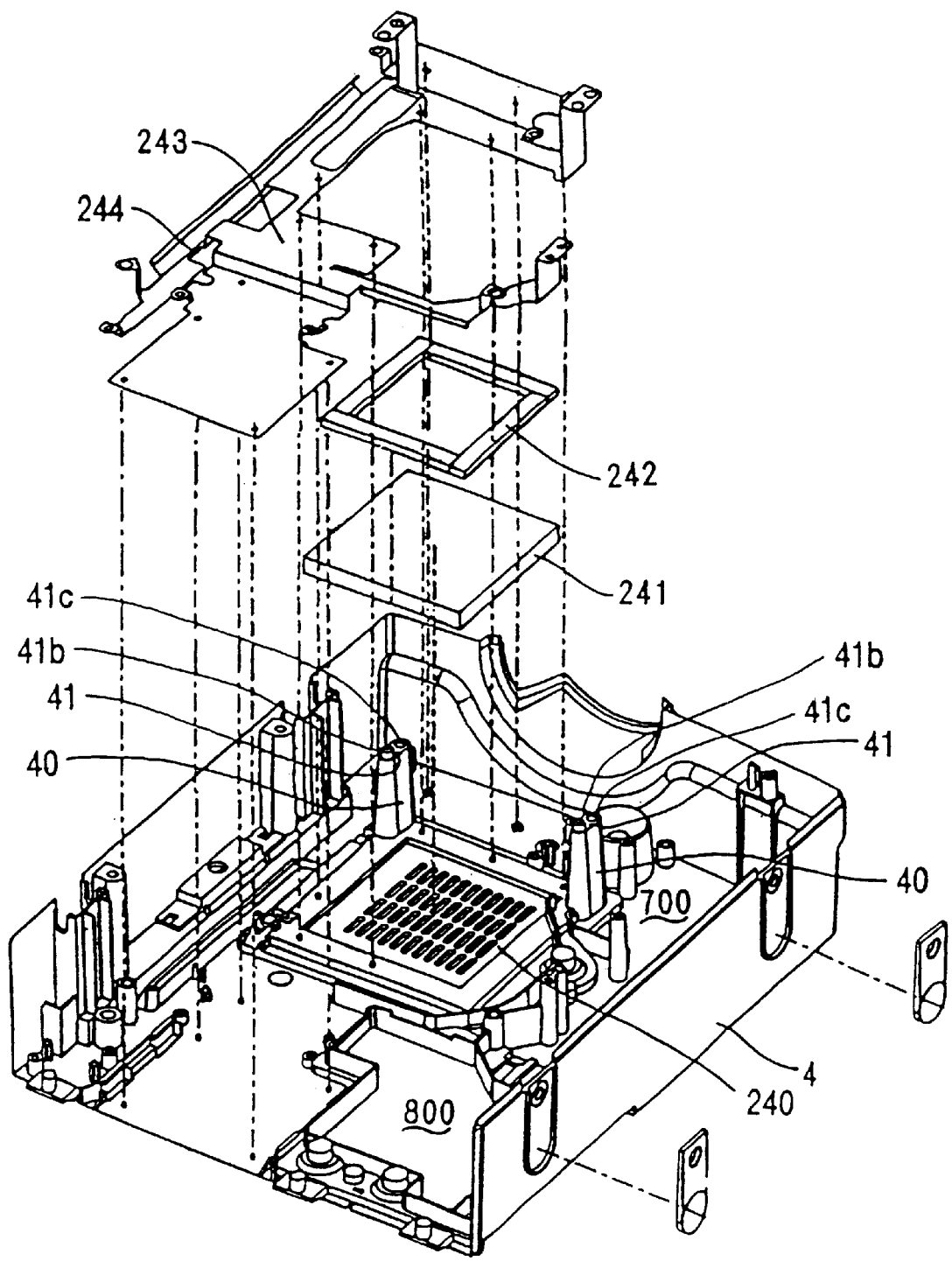

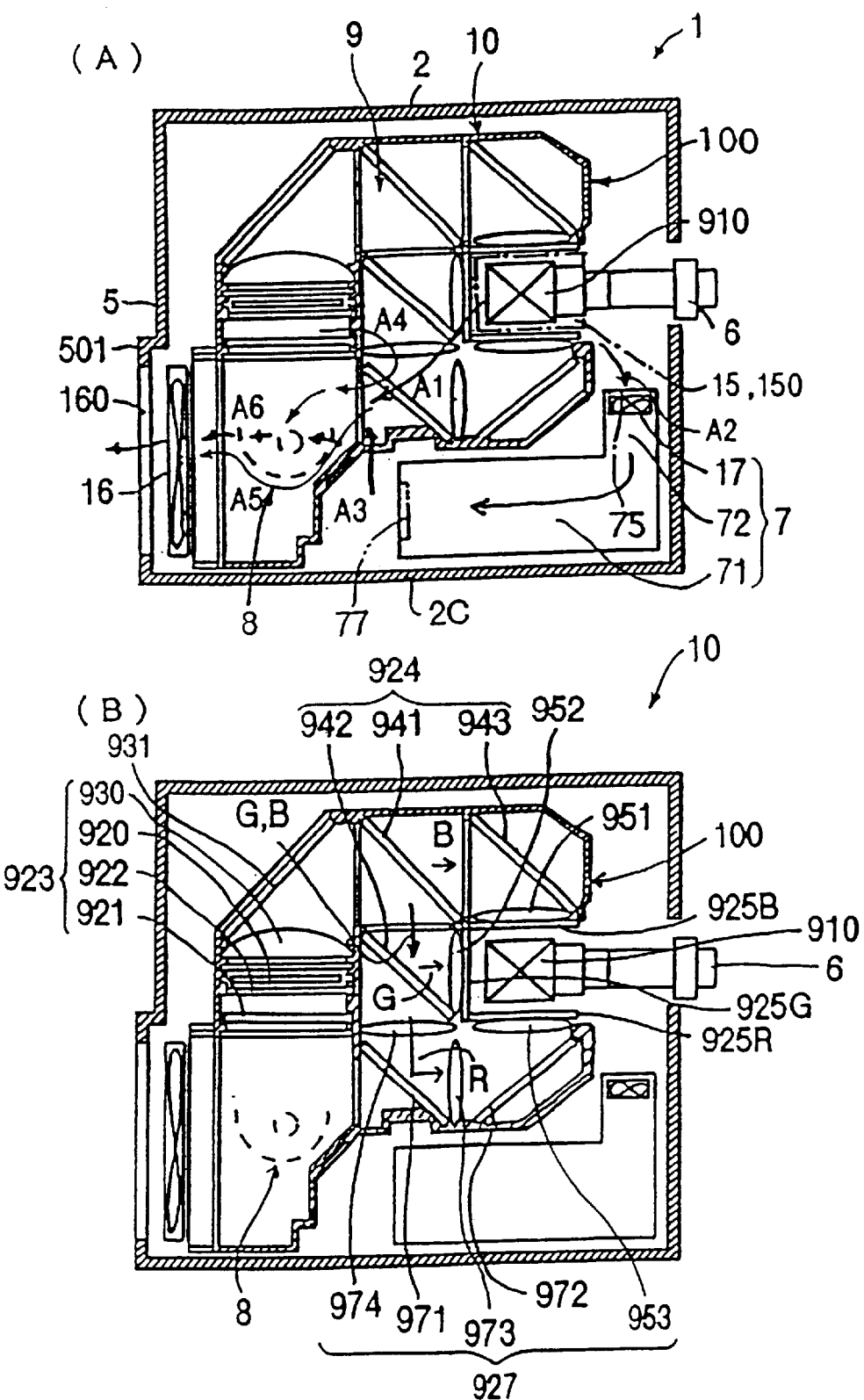
[FIG. 4]

[FIG. 5]
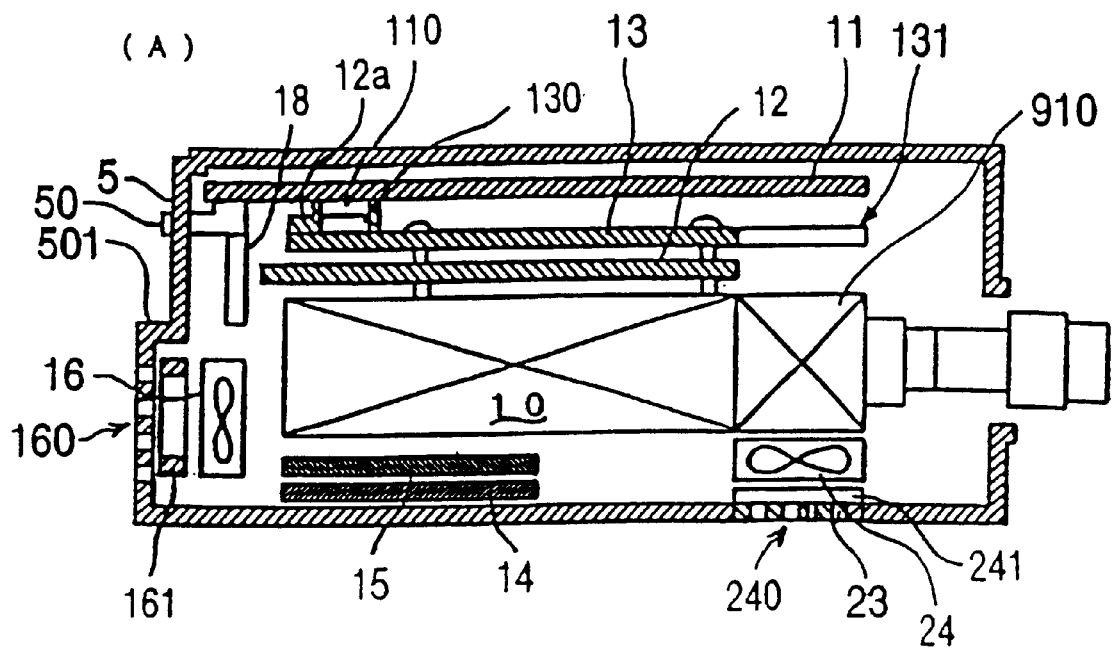
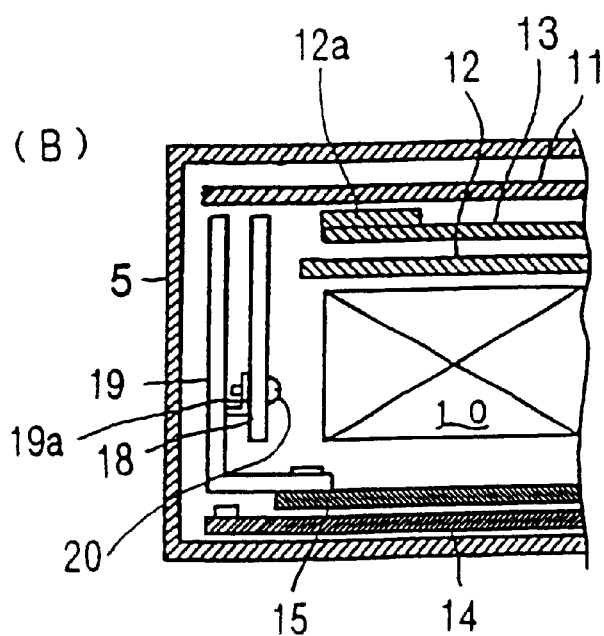

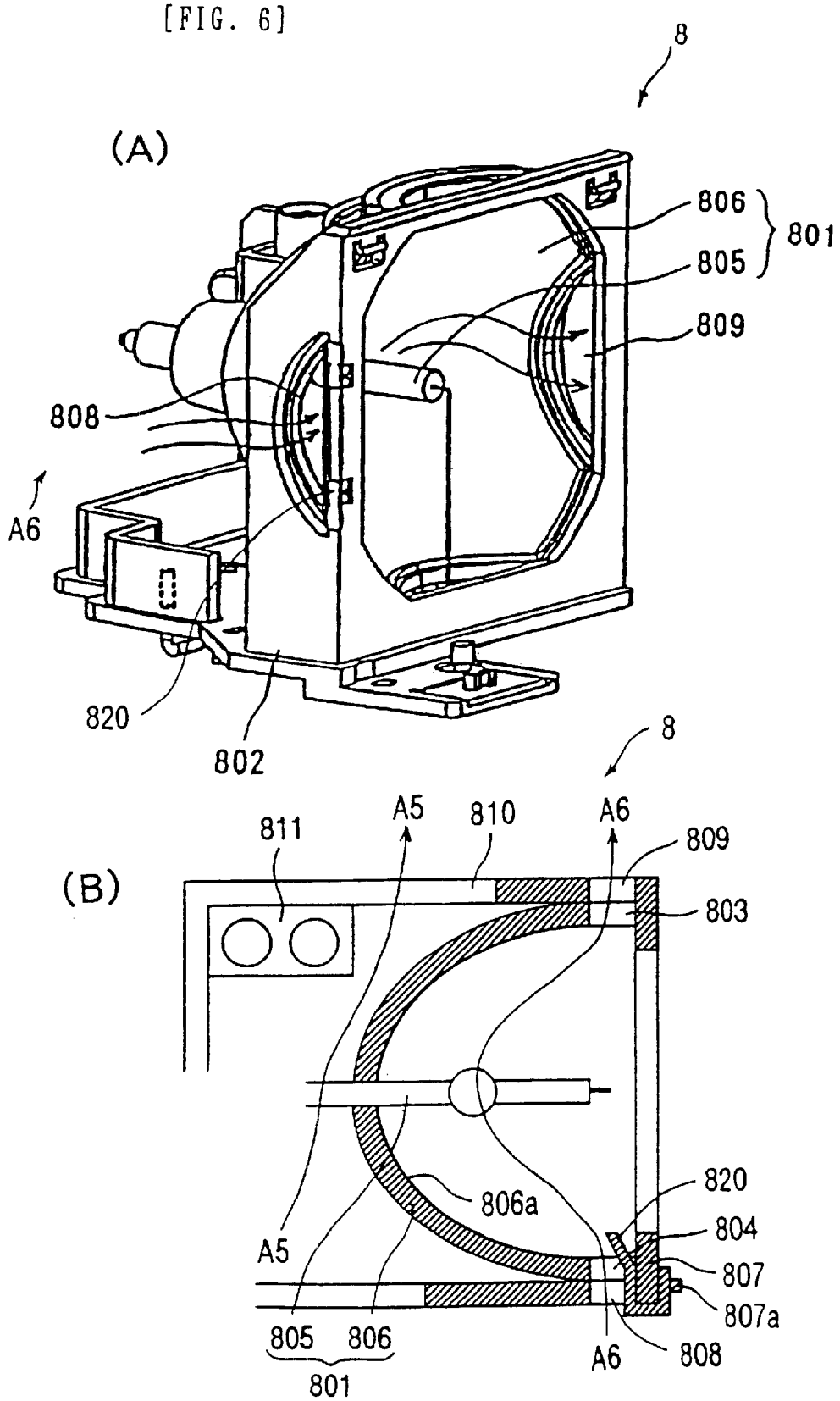
[FIG. 6]

[FIG. 7]
(A)
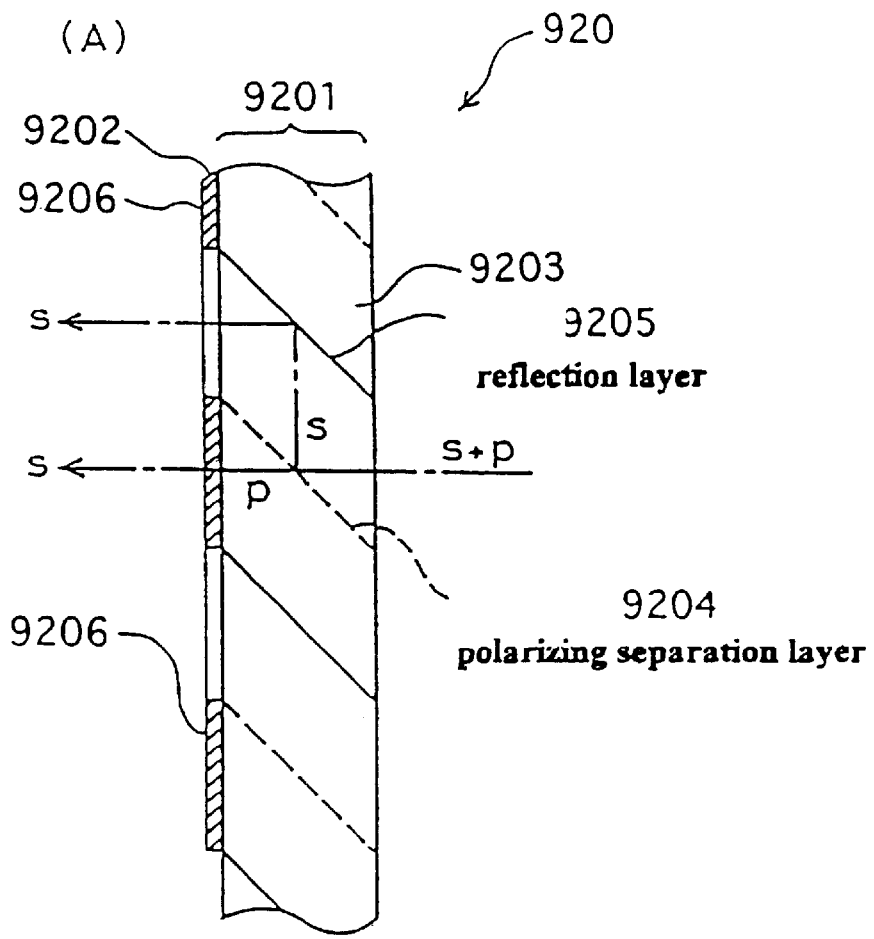
(B)
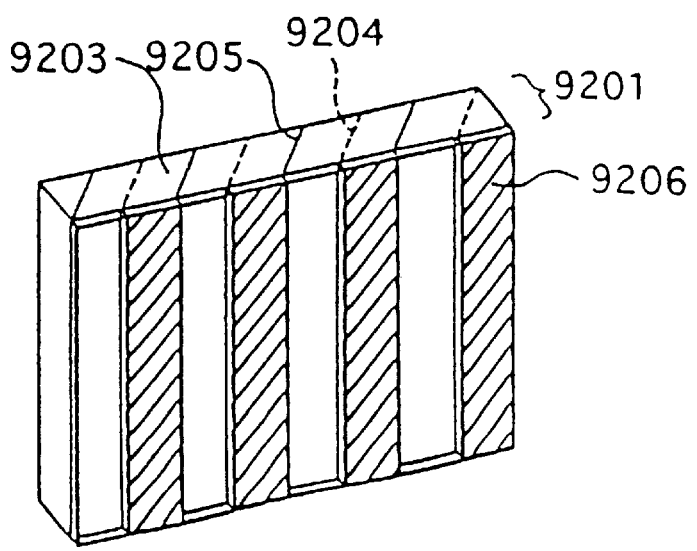

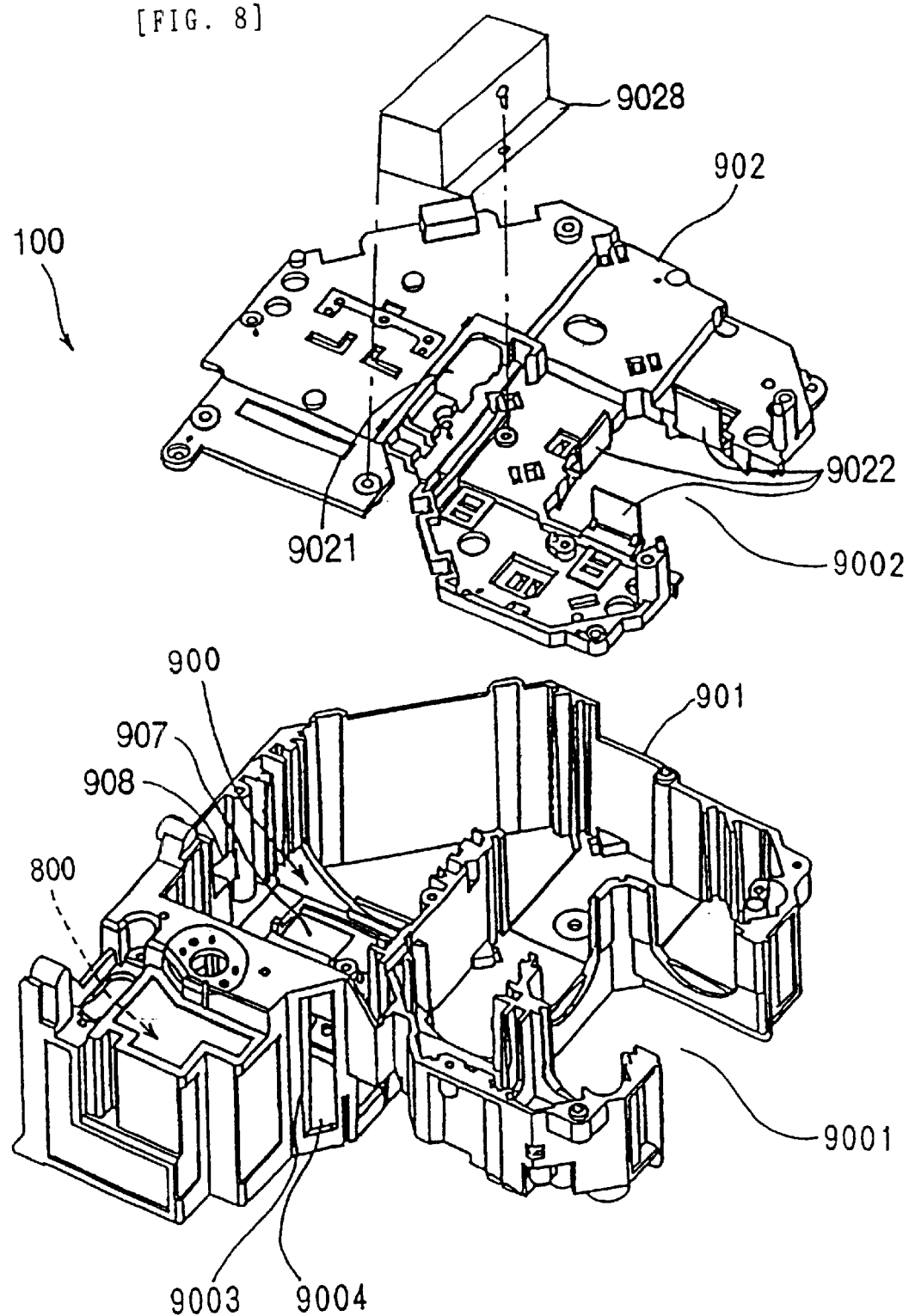
[FIG. 8]

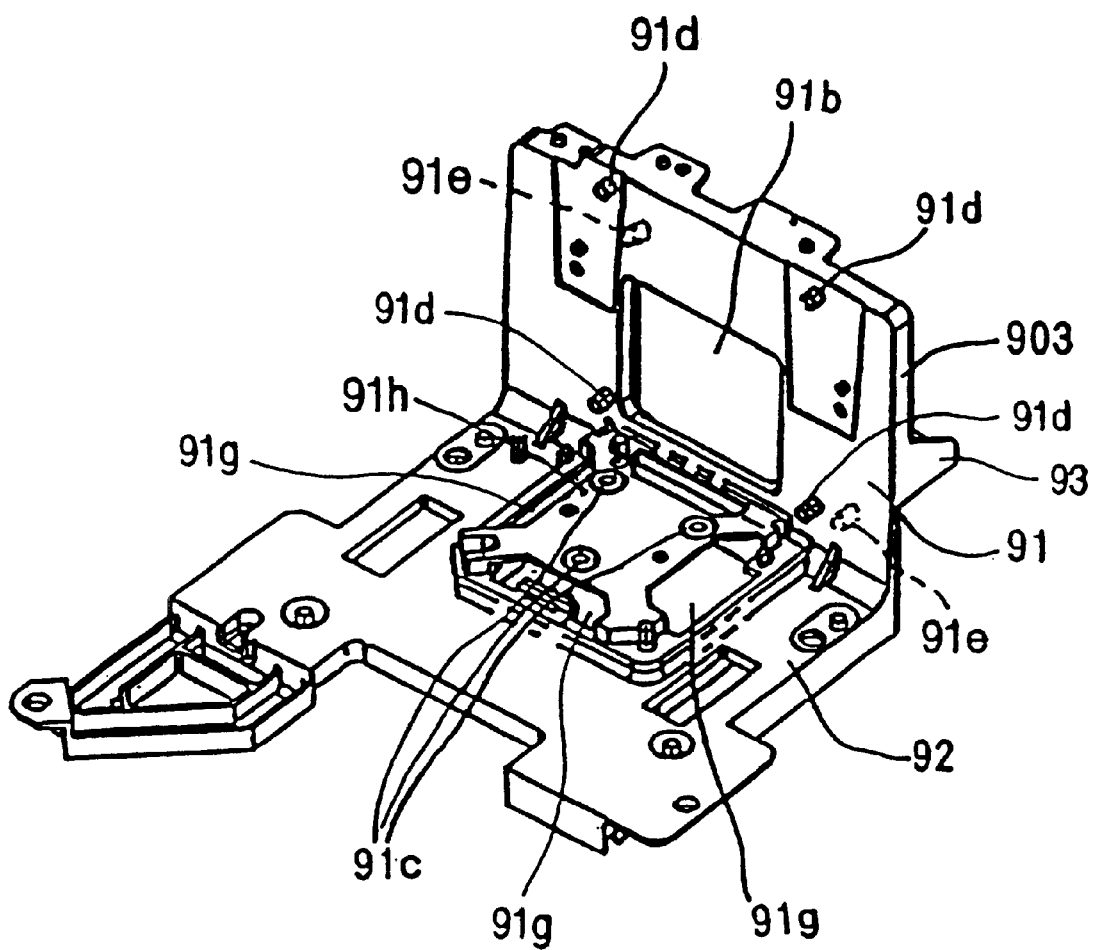
[FIG.9]

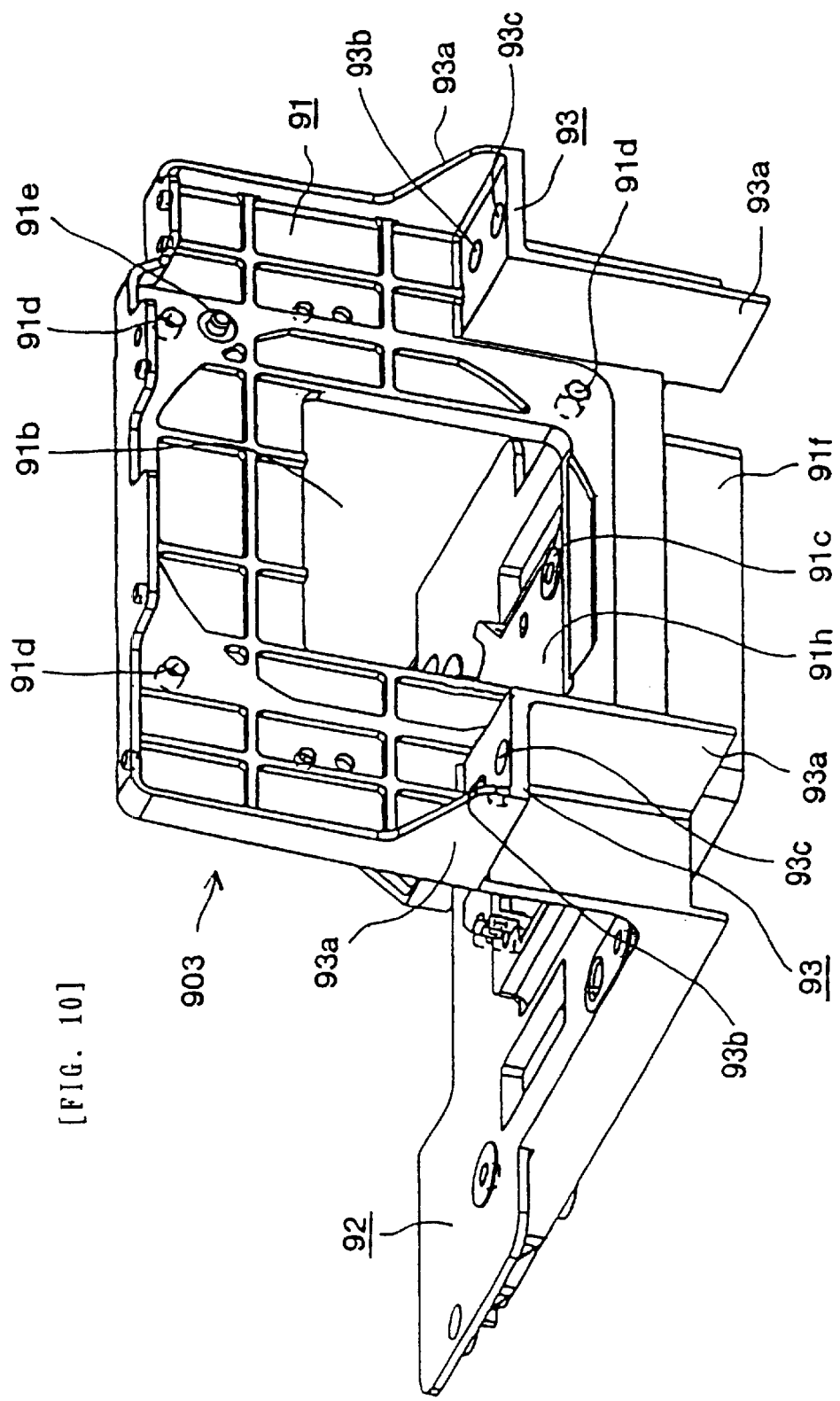
[FIG. 10]

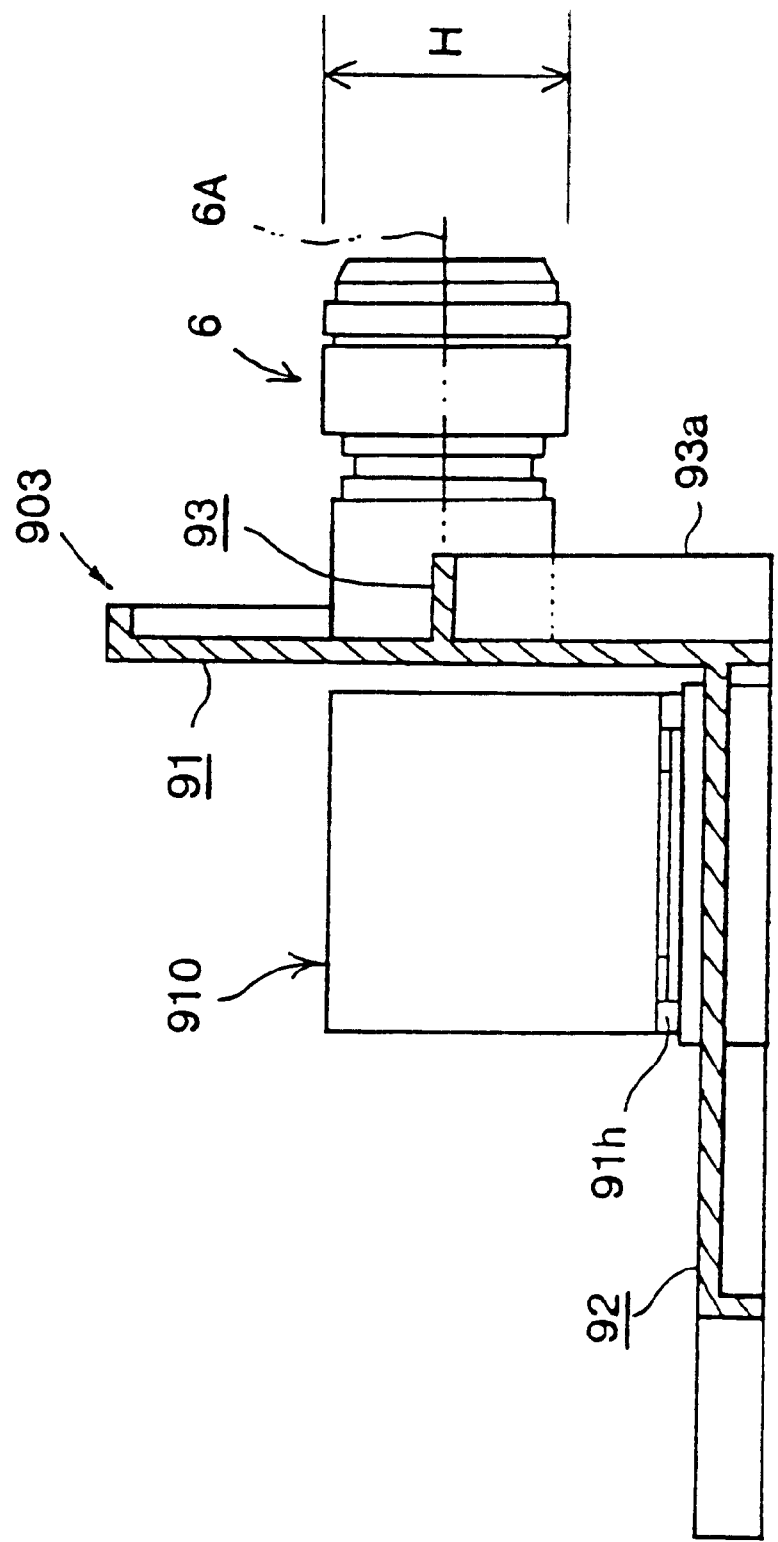

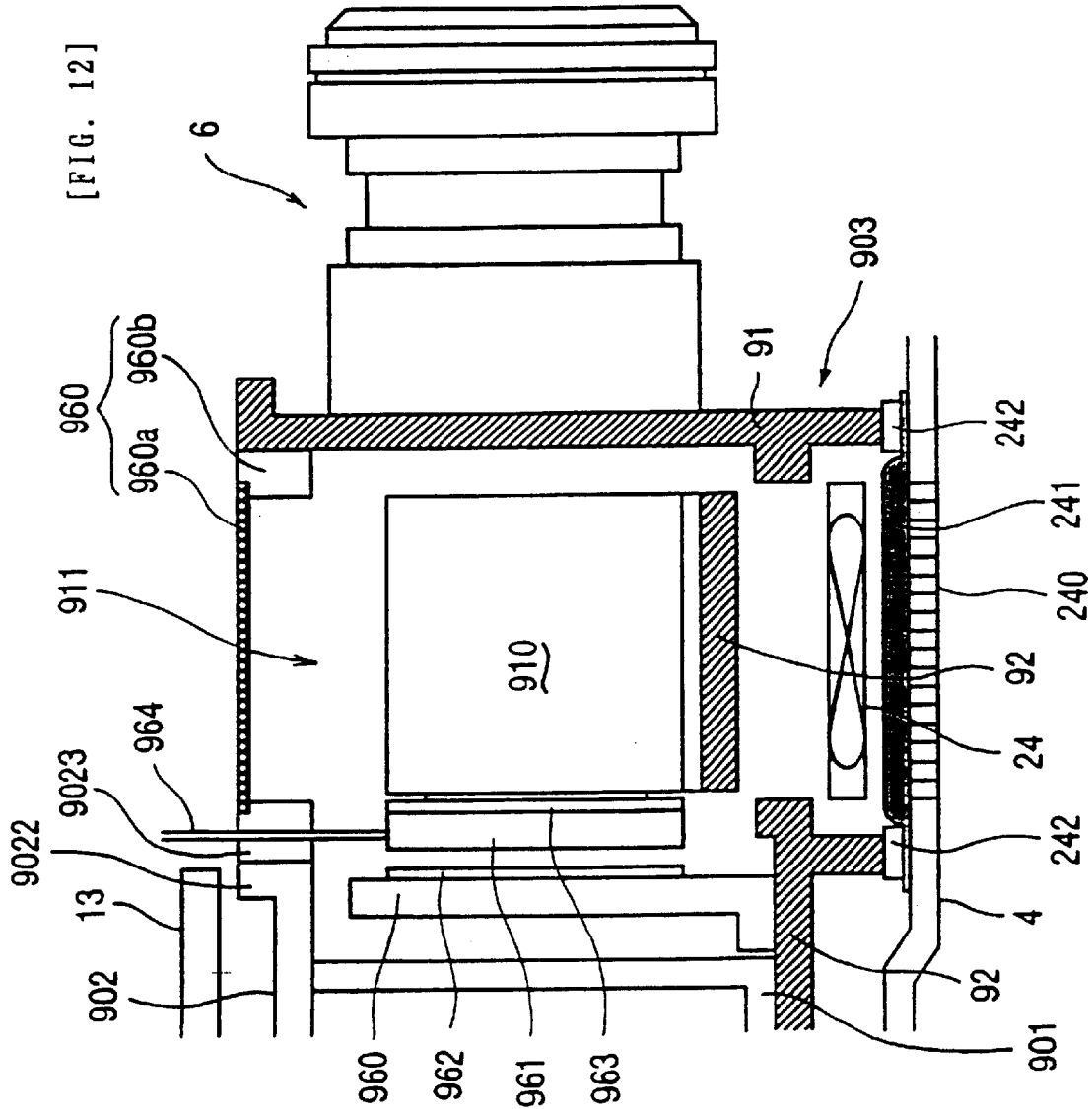

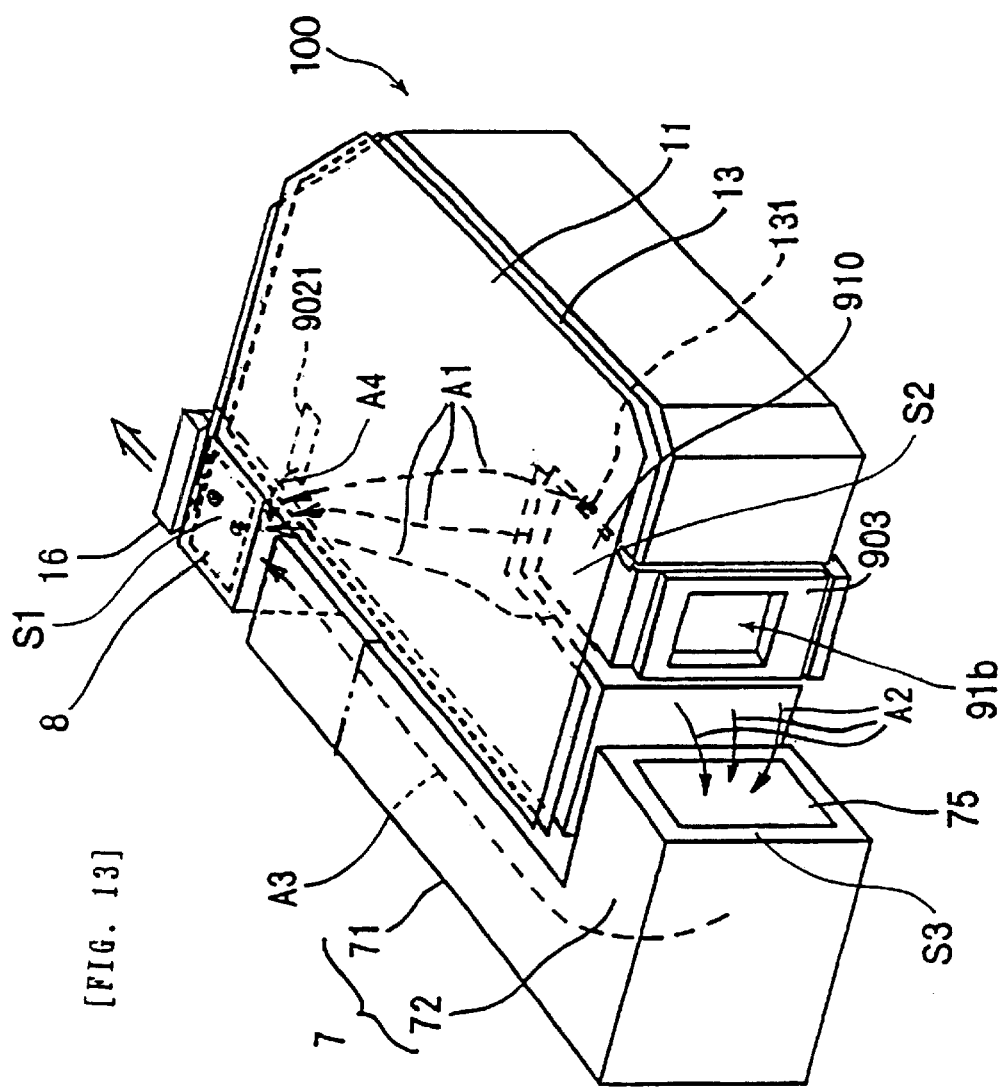

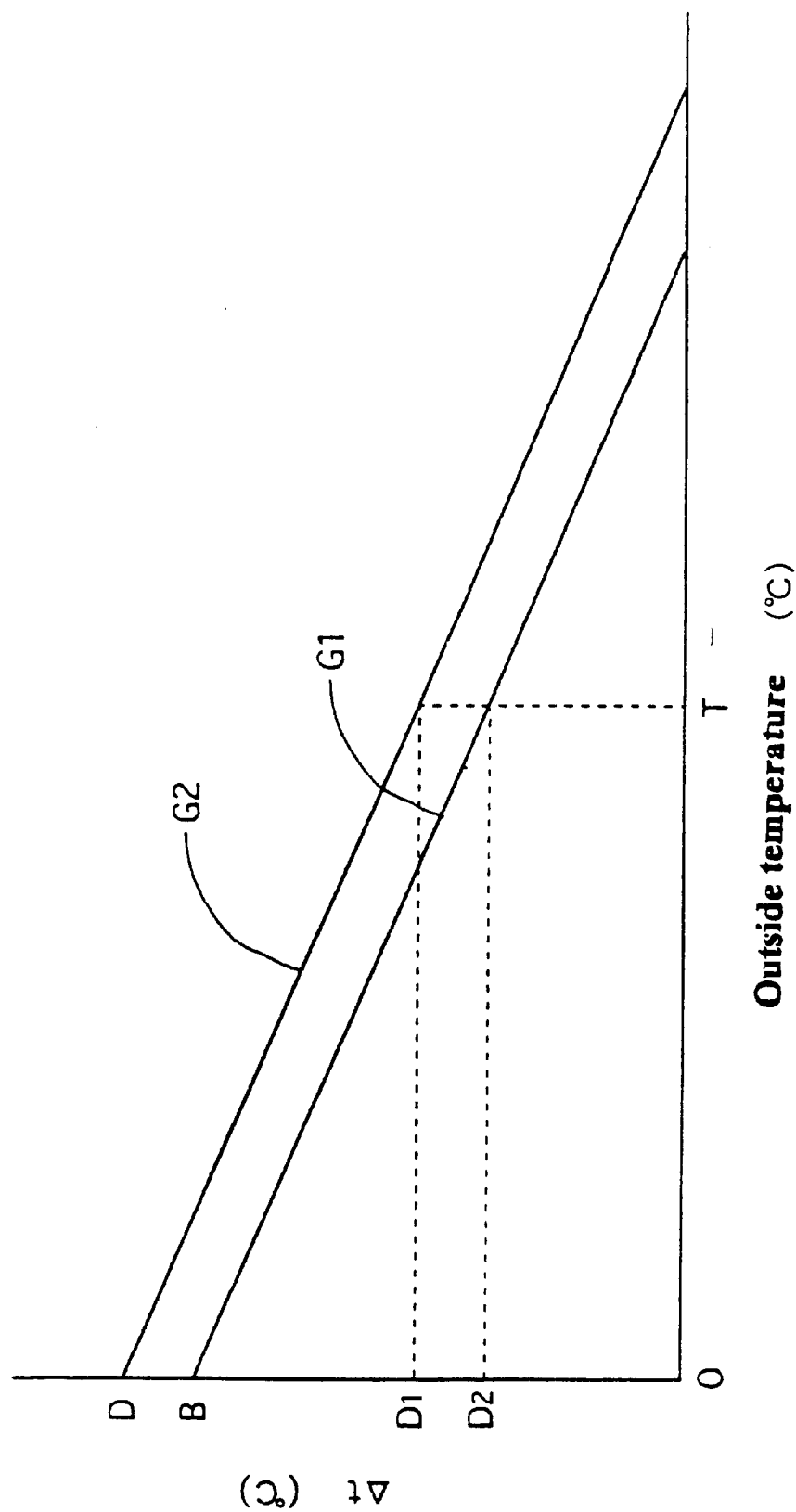

PROJECTOR

BACKGROUND OF THE INVENTION

1. Field of the Invention

The present invention relates to a projection display provided with an optical unit to optically process the luminous flux emitted from a light source lamp unit and project the magnified image on a projection surface by a projection lens unit, a power source unit to feed the power to the optical unit, and an external case to store the optical unit and the power source unit.

2. Description of Related Art

A projection display provided with an optical unit to optically process the luminous flux emitted from a light source lamp unit and project the magnified image on a projection surface by a projection lens unit, a power source unit to feed the power to the optical unit, an external case to store the optical unit and the power source unit, and a plurality of circuit substrates to control the optical unit has been conventionally known.

The optical unit of the projection display is provided with a color separation optical system to separate the luminous flux emitted from a light source lamp into the luminous flux of the primary colors, a modulation system to emit each of the separated luminous flux as the modulated luminous flux based on the image information, and a color synthesis optical system to synthesize each modulated luminous flux and emit it to the projection lens unit, in addition to the light source lamp unit and the projection lens unit which are mentioned above.

The color separation optical system and the modulation system of the optical unit are stored and arranged together with the light source lamp unit in a light guide in which the prescribed optical path is secured. The light guide is split into an upper part and a lower part to hold the optical elements such as the color separation optical system from the upper part and the lower part.

The color synthesis optical system and the projection lens unit of the optical unit are mounted on a head plate provided with a vertical wall and a bottom wall extending in the horizontal direction from a lower end of the vertical wall. More specifically, a base end side of the projection lens unit is fixed to the vertical wall, the color synthesis optical system is arranged on the bottom wall, and the projection lens unit and the color synthesis optical system are integrated in a condition where the optical axes are aligned with each other through the vertical wall.

The head plate is fixed to the light guide by screwing the lower end part of the vertical wall to a lower light guide so that the modulated luminous flux is incident on the color synthesis optical system on the head plate from the modulation system in the light guide. In this projection display, it is strongly desired to integrate the system to facilitate the handling, and miniaturized to a minimum.

These projection displays have the following disadvantages.

(1) A cooling mechanism to cool a light source lamp, a power source unit and a circuit substrate which are stored in the external case is built in the above-mentioned projection display. The power source unit is cooled because the power source unit is provided with a primary side active filter, a power source, a ballast, etc., and the elements to be mounted thereon are the source of heat generation, a heat sink is fixed to each element to store the heat, and the heat sink is cooled.

However, the above-mentioned various kinds of optical systems must be mounted on the projection display to obtain the parallel luminous flux, and the ratio in volume of the optical system in the external case is increased. If the display is fully cooled, each component of the display can not be arranged too closely, raising a problem of limitation in miniaturization. Even if each component is arranged in a close contacting manner, there raises a problem that no efficient cooling can be performed.

(2) In the above-mentioned projection display, the head plate is connected to the light guide at the lower end part of the vertical wall, the distance between the connection part and the center of gravity of the projection lens unit is long, and the vertical wall can be deflected by the load of the projection lens unit to cause the deviation of the optical axis of the color synthesis optical system from the optical axis of the projection lens unit. Because the moment caused by the disturbance and impact at a part to which the projection lens unit is fixed generates the bending stress in a root part of the bottom wall and vertical wall of the head plate, the bending stress also has to deal with this problem. Thus, the vertical wall must be reinforced by providing a large number of ribs, raising a problem that the structure of the head plate is complicated.

SUMMARY OF THE INVENTION

The first object of the present invention is to provide a projection display capable of miniaturizing the display, and efficiently cooling the inside of the display in the projection display provided with an optical unit to optically process the luminous flux emitted from a light source lamp unit and project the magnified image on the projection surface by a projection lens unit, a power source unit to feed the power to the optical unit, and an external case to store said optical unit and said power source unit.

The second object of the present invention is to provide a projection display capable of simplifying the structure of a head plate in the above-mentioned projection display.

The first aspect of the present invention provides a projection display provided with an optical unit to optically process the luminous flux emitted from a light source lamp unit and project the magnified image on the projection surface by a projection lens unit, a power source unit to feed the power to the optical unit and a light source lamp unit, and an external case to store said optical unit and said power source unit, wherein in that an air inlet to suck the air for cooling from the outside of the display, and a discharge port to discharge the air inside the display outside are formed in said external case, one end part of said power source unit is arranged in the vicinity of said air inlet, an opening for suction to suck the air for cooling into said power source unit is provided in said one end part, an opening for discharge to discharge the air inside said power source unit is provided on the other end part of said power source unit, said light source lamp unit is arranged between the discharge port formed in said external case and an opening for discharge provided on the other end part of said power source unit, and the air to be discharged from the opening for discharge formed in the said other end part is distributed inside said light source lamp unit and utilized for the air for cooling said light source lamp.

In the first aspect of the invention, the power source unit is provided with the suction opening and the discharge opening, and the inside of the power source unit can be efficiently cooled independently from other parts, and the optical unit and the power source unit are closely arranged to miniaturize the display.

The above-mentioned opening for suction is preferably provided with a suction fan.

Because the air for cooling can be forcibly sucked inside the power source unit by the suction fan, the cooling efficiency inside the power source unit can be further improved.

The above-mentioned discharge port is preferably provided with a shielding means to cover the discharge port from the inside, and, for example, a shielding means of louver type which is formed by laminating a plurality of plate-shaped material having the length astride the discharge port is preferably adopted.

Because the shielding means is provided on the discharge port, no light is leaked from said discharge port even when the light source lamp unit is arranged in the vicinity of the discharge port, and convenience of the projection display is further improved.

Because the shielding means is formed of louver shape, the discharge from the discharge port is not shielded by the shielding means, and an appropriate discharge condition can be ensured.

Furthermore, the above-mentioned light source lamp unit is preferably provided with a light source lamp comprising a lamp body and a reflector, a box-shaped lamp housing to store the light source lamp, and a vent hole to lead said air for cooling to said lamp body is preferably formed on a side of said lamp housing which is approximately orthogonal to an opening surface of the reflector.

Because the lamp housing to constitute the light source lamp unit is provided with the vent hole, the air for cooling is fed to the lamp body through this vent hole to promote the cooling efficiency of the light source lamp unit.

The above-mentioned vent hole is preferably provided with a deflector distributing plate to lead the air for cooling to the lamp body.

Because the vent hole is provided with the deflector distributing plate, the lamp body can be appropriately cooled when the air for cooling is distributed through the vent hole, and the cooling efficiency of the light source lamp unit is further promoted.

When the optical unit has a color separation optical system to separate the luminous flux into a plurality of luminous fluxes, a modulation system to modulate each of the separated luminous fluxes based on the image information and emit it as the modulated luminous flux, and a color synthesis optical system to synthesize each modulated luminous flux and emit it into the projection lens unit, the above-mentioned air inlet is preferably formed below said color synthesis optical system.

Because the air inlet is formed below the color synthesis optical system, the air for cooling to be sucked from the outside first cools the color synthesis optical system and the modulation system.

After cooling the color synthesis optical system and modulation system, the air for cooling can cool other hotter parts such as the light source lamp unit, the power source unit and circuit substrate, and the inside of the display can be efficiently cooled without waste.

Furthermore, when a circuit substrate to control said optical unit is provided on an upper part of the optical unit, a part of the air for cooling to be sucked from the air inlet is preferably collected to an upper part of said color synthesis optical system, distributed along the circuit substrate, and discharged from said discharge port.

Not only one circuit substrate but also a plurality of circuit substrates having different functions may be laminated on an upper part of the optical unit, and, for example, a driver substrate and a video substrate may be provided on the optical unit in a laminated condition.

Because the air for cooling is distributed along the circuit substrate hotter than the color synthesis optical system and modulation system, the air cooling the color synthesis optical system and modulation system can be used as the air for cooling for the circuit substrate, and further, the air after cooling can be used as the air for cooling the hotter light source lamp unit, and the cooling efficiency in the display is further improved.

When the above-mentioned air inlet is formed below the color synthesis optical system, a dust-proof means is preferably provided above the color synthesis optical system.

Because the dust-proof means is provided above the color synthesis optical system, reverse flow of dust, etc. to the color synthesis optical system side can be prevented when the flow of the air for cooling is stopped.

The second aspect of the present invention provides a projection display provided with an optical unit to optically process the luminous flux emitted from a light source lamp unit and project the magnified image on the projection surface by a projection lens unit, a power source unit of approximate L-shape to feed the power to said optical unit and light source lamp unit, and an external case to store said optical unit and said power source unit, characterized in that an air inlet to suck the air for cooling from the outside of the display is formed on said external case, said power source unit is arranged aside said optical unit, and one end part is arranged in the vicinity of said projection lens unit.

In the second aspect, because an opening for suction of the power source unit is formed in the vicinity of the projection lens unit, the air for cooling can be introduced from the gap between the external case and the projection lens unit, and the power source unit can be efficiently cooled similar to the above-mentioned structure, and the display can be miniaturized. In particular, the power source unit is of approximate L-shape, the power source unit can be efficiently stored in a space demarcated by the external case, the optical unit and the projection lens unit, and the display can be further miniaturized.

An opening for suction to suck said air for cooling into the power source unit is provided in one end part of the above-mentioned power source unit, an opening for discharge to discharge the air in said power source unit is provided on the other end part of the power source unit, and said one end part of the power source unit is preferably arranged in the vicinity of the air inlet provided in the external case.

Because the power source unit is of approximate L-shape, the opening for suction can be arranged in the vicinity of the air inlet to further improve the cooling efficiency of the power source unit.

The above-mentioned light source lamp unit is preferably arranged between the port for discharge formed in said external case and an opening for discharge provided on the other end part of the power source unit.

Because the light source lamp unit is arranged between the port for discharge and the opening for discharge, the air for cooling which cools the inside of the power source unit can be used for cooling the hotter light source lamp unit to further improve the cooling efficiency in the display.

The third aspect of the present invention provides a projection display provided with an optical unit to optically process the luminous flux emitted from a light source lamp unit and project the magnified image on the projection surface by a projection lens unit, wherein an outside temperature detecting means to detect the temperature outside the display and an inside temperature detecting means to detect the temperature inside the display are provided, and the cooling control of said projection display is performed according to the differential temperature between the inside temperature to be detected by said inside temperature detecting means and the outside temperature to be detected by said outside temperature detecting means.

The cooling control of the display is defined as the control of the air volume by a suction fan, a discharge fan, etc. provided, for example, in the display, or the control to turn off the lamp body of the light source lamp unit with large heat generation.

In the third aspect of the invention, the cooling control of the display is performed according to the differential temperature between the outside temperature and the inside temperature, and it is possible to determine the actual temperature of the components of the display by the temperature of the air for cooling to be discharged, and appropriate cooling control can be performed.

The above-mentioned projection display is provided with the external case to store the light source lamp unit and the optical unit, an air inlet to suck the air for cooling from the outside of the display is formed in the external case, and the outside temperature to be detected by the outside temperature detecting means is preferably the temperature of the air to be sucked from the air inlet provided in the external case.

Because the temperature to be detected by the outside temperature detecting means is the temperature of the air to be sucked from the air inlet, the outside temperature of each component of the projection display immediately before cooling can be detected, and the cooling control of better accuracy can be performed.

The fourth aspect of the present invention provides a projection display provided with a optical unit to optically process the luminous flux emitted from a light source lamp unit and project the magnified image on the projection surface by a projection lens unit, a power source unit to feed the power to the optical unit, and an external case to store said light source lamp unit, said optical unit, and said power source unit, wherein said optical unit is provided with a color separation optical system to separate said luminous flux into a plurality of color luminous fluxes, a modulation system to modulate each of said separated luminous fluxes based on said image information and emit it as the modulated luminous flux, and a color synthesis optical system to synthesize each of said modulated luminous flux and emit it to said projection lens unit, said projection lens unit and said color synthesis optical system are mounted on a head plate, a supporting part to support said head plate is provided in said external case, and said head plate is provided with a vertical wall to which a base end side of said projection lens unit is fixed, a bottom wall which is extended in the horizontal direction from a lower end part of the vertical wall to support said color synthesis optical system, and a supported part to be supported by said supporting part provided in said external case.

Said supported part is preferably provided on said vertical wall in the range of height from the position of an upper end to the position of a lower end of a contour of said projection lens unit.

The range of height from the height position of an upper end to the height position of a lower end of a contour of said projection lens unit includes the same height position as the respective height position of the upper end and the lower end of the projection lens unit.

In the fourth aspect of the invention, the supported part is provided at the height position in the range of the contour height of the projection lens unit in the vertical wall. So the bending stress generated in a root part (a lower end part) of the vertical wall of the head plate by the bending moment generated according to the center of gravity of the projection lens unit can be efficiently diffused and absorbed by the supporting part of the external case, the bending stress can be mitigated, and deflection of the vertical wall can surely be prevented. Thus, no complicated reinforcement structure is required to be installed on the vertical wall, and the structure of the head plate can be simplified. Furthermore, the projection lens unit and the color synthesis optical system can be correctly positioned through the vertical wall, and the deviation of the optical axis can surely be prevented.

When the contour of the projection lens unit is approximately as large as that of the vertical wall, the supported part is preferably provided at the height position of not less than ¼ from the lower end of said vertical wall when the whole height of the vertical wall is defined as 1, and more preferably, in the height range between ⅓ and ⅔.

Further, said supported part is preferably provided approximately as high as the optical axis of said projection lens unit.

If the supported part is provided at such a position, the center of gravity of the projection lens unit can be approximately as high as the supported part, or the supported part can be higher than the center of gravity, the load on the projection lens unit can be efficiently diffused, and the structure of the vertical wall can be further simplified.

The supported part comprises a fixed surface which is projected from said vertical wall parallel to said bottom wall and supported and fixed by said supporting part, and reinforcement ribs orthogonal to the fixed surface are preferably erected on said vertical wall.

When the supported part comprises the fixed surface projected on the vertical wall, the supported part can also be used as reinforcement ribs to reinforce the vertical wall. The rigidity of the vertical wall can further be improved using a simple structure by provided reinforcement ribs orthogonal to the fixed surface.

Furthermore, said head plate is preferably made of magnesium formed body, and the weight of the display can be reduced and the excellent formability can be secured thereby because the specific gravity can be reduced. Moreover, magnesium can improve the reliability of the impact resistance while the weight is reduced by taking advantage of the thin-walled construction to a maximum.

BRIEF DESCRIPTION OF THE DRAWINGS

FIGS. 1(A) and (B) are a front elevational view and a rear elevational view illustrating a projection display related to one embodiment of the present invention;

FIGS. 2(A) and (B) are a top plan view and a bottom plan view of said embodiment;

FIG. 3 is an outline perspective view illustrating an internal structure of a lower case part of the external case in said embodiment;

FIGS. 4(A) and (B) are horizontal sectional views illustrating an arrangement of the optical unit and the power source unit and a structure of the optical unit in said embodiment;

FIGS. 5(A) and (B) are a vertical sectional view of the projection display showing the arrangement and structure of the circuit substrate, and a partial perspective view illustrating the discharge port in said embodiment;

FIGS. 6(A) and (B) are a schematic perspective view and a horizontal sectional view illustrating a structure of the light source lamp unit in said embodiment;

FIGS. 7(A) and (B) are a horizontal sectional view and an outline perspective view illustrating a structure of a polarizing conversion element to constitute an illumination optical system in said embodiment;

FIG. 8 is a schematic perspective view illustrating a structure of a light guide to store the optical unit in said embodiment;

FIG. 9 is a schematic perspective view illustrating a structure of the head plate to support the prism unit which is the color synthesis optical system in said embodiment;

FIG. 10 is a perspective view illustrating the head plate in said embodiment;

FIG. 11 is a sectional view illustrating the height position of the supported part of the head plate in said embodiment;

FIG. 12 is a vertical sectional view illustrating a structure of a duct of the air inlet in said embodiment;

FIG. 13 is an outline perspective view illustrating the cooling structure of the optical unit, the power source unit, and the circuit substrate in said embodiment; and FIG. 14 is a graph illustrating the control range of the temperature monitoring by the internal temperature sensor and the external temperature sensor in said embodiment.

DETAILED DESCRIPTION OF THE PREFERRED EMBODIMENTS

The projection display of one embodiment of the present invention is explained below referring to the drawings.

1. Whole Structure of Display

FIGS. 1 (A), (B) illustrate a front elevational view and a rear elevational view of a projection display 1 related to the first embodiment, and FIGS. 2(A), (B) illustrate a top plan view and a bottom plan view of the projection display 1.

The projection display 1 is of approximately rectangular parallelepiped shape, and comprises an external case 2 in which an optical unit 10 which is mentioned below is stored, and a projection lens unit 6 which is projected on a front of the external case 2.

The external case 2 is split into an upper part and a lower part approximately at the center of the projection lens unit 6, and comprises an upper case 3 to cover an upper surface part of the projection display 1, a lower case 4 to cover a bottom surface part, and a rear case 5 to cover a rear surface part of the projection display 1 illustrated in FIG. 1(B).

2. Structure of External Case

The upper case 3 comprises a rectangular upper wall 3a, right and left side walls 3b,3c extended downward in an approximately perpendicular manner from three sides except its rear side, and a forward wall 3d.

A large number of communication holes 25R,25L are formed in right and left ends on the forward side of the upper wall 3a of the upper case 3 as illustrated in FIG. 2(A), and a built-in speaker (not indicated in the figure) is provided in a part inside the display corresponding to the communication holes 25R,25L. An operation switch 26 to adjust the image quality, focal point, etc. of the projection display 1 is provided in an approximately center part of the upper wall 3a.

As is seen from FIG. 1(A), a photoelectric plate 351 to receive the remotely controlled signal having similar function to that of the operation switch 26 is provided on a front surface of the display, and said projection display 1 can be remotely controlled.

The lower case 4 comprises a rectangular bottom wall 4a, right and left side walls 4b,4c erected in an approximately perpendicular manner from three sides except its rear side, and a forward wall 4d.

A lamp exchange lid 27 to exchange a light source lamp unit 8 (to be mentioned below) to be stored inside, and an air filter cover 23 in which an air inlet 240 to cool the inside of the display is formed are provided on the bottom wall 4a as indicated in FIG. 2(B).

A large number of suction holes 271 are formed in the lamp exchange lid 27, and the cooling air is fed to the inside of the display not only from the air inlet 240 but also from the suction holes 271.

Rear end feet 31R,31L are provided on right and left corner parts at the rear part of the bottom wall 4a as indicated in FIG. 1 and FIG. 2(B), and a forward foot 31C for height adjustment is provided at the position corresponding to the projection lens unit 6 at the forward end, and these are projected to the lower surface side of the bottom wall 4a.

An adjustment mechanism capable of adjusting the projection by turning is provided on the rear end foot 31R, adjustment in the horizontal direction of the projected screen can be performed thereby, and an adjustment mechanism capable of performing adjustment in the vertical direction of the projected screen by a foot button 310 as indicated in FIG. 1(A) and FIG. 2(A) is provided on the forward foot 31C.

A power source cable shield plate 243 is provided in the lower case 4 as shown in FIG. 3, and the power source cable shield plate 243 is provided with a wiring insertion part 244 to cover the AC input line.

The power source cable shield plate 243 is provided to shield the noise generated from the AC input line, and is also used as a bus line of the ground of a power source unit 7, a video substrate 11, and a driver substrate 13 which are mentioned below.

The air inlet 240 is covered by a sponge-like air filter 241, and can prevent ingress of dust, etc. from this part. A cushion material 242 made of foamed urethane is arranged on the periphery of the air inlet 240, and ingress of dust, etc. from the periphery of the air inlet 240 can also be prevented.

As shown in FIG. 2, the forward wall 3d of the upper case 3 and the forward wall 4d of the lower case 4 are curved in a condition where the center part is slightly projected forward. A circular opening 33, around which an annular rim 32 is formed, is formed in this part, and the forward end side part of the above-mentioned projection lens unit 6 is projected from this opening 33.

A tip part of the projection lens unit 6 is supported by a guard part 42 extended along the bottom wall 4a. The guard part 42 is a thick rim to cover the tip part of the projection lens unit 6 in a hood shape. The forward end side of the display can be lifted with a hand on the guard part 42 without imposing a burden on the projection lens unit 6.

A rear case 5 is basically of the structure to guide and hold a telescopic part of the upper case 3 and the lower case 4.

The rear case 5 is engaged with three hook parts formed in its upper end is formed along an inner edge of the upper case 3 though it is not shown in FIG. 1(B), and the rear case is held by screwing and fixing the lower end from the inner side of the lower case 4.

An AC inlet 51 for the external power supply and various input/output terminal groups 50 are arranged on the left side of a rear wall 5d of the rear case 5, and an expansion part 501 is formed on its right side. A discharge port 160 to discharge the air inside the display is provided in the expansion part 501.

Because the AC inlet 51 and the input/output terminal groups 50 to which cords such as the signal cable are connected are arranged on the rear wall 5d of the rear case 5, no signal cables, etc., are connected to a side part of the display on which a user is usually present, and this arrangement is convenient for users.

3. Internal Structure of Display

FIG. 4 and FIG. 5 illustrate the internal structure of the projection display 1. As is shown in FIG. 4, the optical unit 10 to magnify and project the image information, and the power source unit 7 which is arranged aside the optical unit 10 and supplies the power to said optical unit 10 are stored in the above-mentioned external case 2.

An air discharge fan 16 to discharge the air in the display and the discharge port 160 are provided in a part adjacent to the light source lamp unit 8 of the optical unit 10.

Furthermore, as is seen from FIG. 5, an air suction fan 24 to suck the outside air into the display and the air inlet 240 are provided below a prism unit 910 of the optical unit 10.

A driver substrate 13 and a video substrate 11 for drive control of the display are arranged in a laminated manner above the optical unit 10.

3-1. Structure of Optical Unit

The optical unit 10 comprises the light source lamp unit 8, an optical lens unit 9 to optically process the luminous flux emitted from the light source lamp unit 8 and form the optical image corresponding to the image information, the prism unit 910 to synthesize the optical image formed by the optical lens unit 9, and the projection lens unit 6 to magnify and project the synthesized optical image on the projection surface as indicated in FIG. 4(A).

The light source lamp unit 8 and the optical lens unit 9 are stored in light guide 100 in which an optical path of approximately L-shape in plan is secured. The prism unit 910 is arranged in notches 9001,9002 (refer to FIG. 8) of the light guide 100, and the projection lens unit 6 is projected from the side of the light guide 100.

The optical path leading from the light source lamp unit 8 to the projection lens unit 6 is approximately L-shaped on the whole. Thus, the plan view of the light guide 100 is approximately L-shaped corresponding thereto. The light guide 100 occupies not less than one half on the rear side of the internal space of the external case 2.

The light source lamp unit 8 is stored at the position of a light source lamp unit storage part 800 as shown in FIG. 3 in an exchangeable condition.

3-2. Structure of Power Source Unit

As shown in FIG. 4(A), the power source unit 7 is stored in a part other than the part occupied by the projection lens unit 6 and the light guide 100 stored in the external case 2, i.e., in a power source unit storage part 700 indicated in FIG. 3. The plan view of the power source unit in which a body part extending forward along the side wall 2c of the external case 2 with its base end in the vicinity of the light source lamp unit 8, and an extension part 72 which is bent at a forward end part of the body part 71 and faces the projection lens unit 6 is approximately L-shaped.

A suction opening 75 is formed in a side of an end part of the extension part 72 which is one end part of the power source unit 7, and a discharge opening 77 is formed in a side of an end part of the body part 71 which is the other end of the power source unit.

Because the air inlet 240 formed in the external case 2 is located below the prism unit 910, the suction opening 75 is arranged in the vicinity of the air inlet 240 and in the vicinity of the projection lens unit 6.

A primary side active filter, a power supply, and a ballast are stored in the power source unit 7 though they are omitted in FIG. 4.

The primary active filter is provided with FET (Field Effect Transistor) for transmission, the power supply is provided with a diode bridge for rectification, a transmission transistor for D/D converter, and 3-terminal regulator for D/D converter, and the ballast is provided with a drive FET for chopper circuit and a reverse current preventive diode for chopper circuit, and these elements are mounted on the circuit substrate.

Because these elements generate heat, a heat sink is positioned to prevent the temperature rise of the elements. The heat sink is forcibly cooled by a suction fan 17 provided in said suction opening 75.

Taking advantage of the approximately L-shape of the optical unit 10 conversely, the area demarcated by the light guide 100, the projection lens unit 6, and the external case 2 is not wasted if the power source unit 7 is also of approximately L-shape. That means, the optical unit 10 and the power source unit 7 can be efficiently arranged in a narrow area, and the projection display 1 can be miniaturized.

The input line from the power source unit 7 to the light source lamp unit 8 is connected to the light source lamp unit 8 through a connector though it is omitted in FIG. 4. The input line is shielded by the shielding material to generate no noise.

3-3. Arrangement and structure of panel substrate As indicated in FIG. 5(A), the driver substrate 13 for drive control of the liquid crystal is screwed into an upper surface of the optical unit 10 above the optical unit 10, and the video substrate 11 on which a video signal processing circuit is mounted parallel thereto is arranged on the upper surface side. A sheet-shaped shield material 12 is arranged between the driver substrate 13 which is located on the lower stage side among the two substrates 11,13 and the optical unit 10.

Electrical connection between the substrates 11,13 is as follows. A connector 110 is arranged on a lower surface of the video substrate 11, and a connector 130 capable of plug-in connection into the connector 110 is arranged on an upper surface of the driver substrate 13.

Thus, the connector 110 is connected to the connector 130 in a condition where the substrates 11,13 are laminated at the prescribed position.

Connection between substrates is performed without placing lead wires or the like in the present embodiment. Thus, noise generation sources are reduced, and generation of noise can be controlled.

Each end part of the driver substrate 13 and the video substrate 11 are arranged in the vicinity of the rear wall 5d of the rear case 5. Input/output terminals of a D-sub connector are directly mounted on end parts, in the vicinity of the rear wall 5d of the rear case 5, of the video substrate 11 to constitute a part of the input/output terminal groups 50 of the rear case 5.

Because the wiring distance can be reduced between the input/output terminal 50 arranged on the rear wall 5d of the rear case 5, and the driver substrate 13 and video substrate 11, the circuit system to process the feeble signal at high speed can be less affected by the noise.

Furthermore, as is seen from FIG. 5(A), an extension part 12a is provided in the shield material 12, and at least a part of the connectors 110,130 is covered by said extension part 12a. Thus, the noise generated from the light source lamp unit 8 (not indicated in FIG. 5) arranged approximately and immediately below the connectors 110,130 can be prevented from being mixed with the connectors 110,130.

A structure where the driver substrate 13 is screwed to the upper surface of the optical unit 10 is convenient when the optical unit 10 is sold as a parts. Generally, the performance characteristic of light valves 925R, 925G, 925B built in the optical unit 10 are slightly different for each optical unit 10. To obtain the image of the same quality by every optical unit 10, the difference in the performance characteristic must be compensated by the electric adjustment. Such an electric adjustment is possible by changing the drive condition of the light valves 925R,925G,925B. The prescribed drive condition may be stored in the circuit built in the driver substrate 13. If the structure where the driver substrate 13 is screwed on the upper surface of the optical unit 10 is adopted, as in the present embodiment, the optical unit 10 can be sold in a condition where the optical unit 10 and the driver substrate 13 are set in one unit, i.e., in a condition where the electric adjustment is completed, and no electric adjustment is required on the customer side.

A remote substrate 14, on which a remote signal processing circuit to process the signal to be inputted from a mouse, etc., is mounted, is arranged on a lower surface side of the optical unit 10. A shield plate 15 is arranged between the remote substrate 14 and the optical unit 10. The remote substrate 14 is arranged in an attachable/detachable manner to/from the rear end side of the display, i.e., from the rear wall 5d side of the rear case 5. Even when a circuit substrate of different circuit arrangement by a machine type must be used for the remote circuit of a mouse, etc., it can be easily accomplished by replacing the remote substrate 14 from the rear end side of the display. An audio substrate 18 to perform the interface of the TV image and the sound signal is arranged in a horizontal condition relative to said end face between the end face on the rear case 5 side of the optical unit 10 and the rear case 5. The audio substrate 18 is connected to an end part of the video substrate 11 by the wire. Furthermore, as indicated in FIG. 5(B), a metallic chassis 19 is arranged between the audio substrate 18 and the rear case 5. The chassis 19 is screwed to the shield plate 15, and the chassis 19 is set to the ground voltage. The mutual wiring distance is reduced by arranging substrates close to each other to make it difficult to be affected by the noise.

The audio substrate 18 is fixed to a bending and rising part 19a provided on a part of the chassis 19 by screws 20 so as to withstand the inserting/drawing force to be applied to an interface terminal mounted on the audio substrate 18.

4. Optical System

The optical system built in the optical unit 10 is explained referring to FIG. 4 (B).

The optical system of the embodiment comprises the light source lamp unit 8, an illumination optical system 923 to unify the in-plane illuminance distribution of the light to illuminate three light valves 925R, 925G, 925B, a color separation optical system 924 to separate the luminous flux to be emitted from the illumination optical system 923, three light valves 925R, 925G, 925B to constitute the modulation system to modulate each color luminous flux, a prism unit 910 as the color synthesis optical system to re-synthesize the modulated color luminous fluxes, and the projection lens unit 6 to project the magnified synthesized luminous flux on the screen.

4-1. Light Source Lamp Unit

The light source lamp unit 8 comprises a light source lamp 801, and an approximately box-shaped lamp housing 802 in which the light source lamp is built as indicated in FIG. 6.

The light source lamp 801 comprises a lamp body 805 such as a metal halide lamp and a reflector 806, and emits the light from the lamp body 805 toward the optical lens unit 9.

A forward side in the optical axis direction of the lamp housing 802 is opened, and vent holes 808,809 to introduce/discharge the cooling air are formed in right and left sides approximately orthogonal to the forward side. Vent holes 803,804 to introduce/discharge the cooling air are also formed in right and left sides of the reflector 806.

A straightening plate 820 is provided on an inlet of the vent hole 808 for the cooling air as indicated in FIG. 6(B) so that the cooling air is efficiently led toward a reflecting surface 806a of the reflector 806 and the lamp body 805. The straightening plate 820 is mounted on a side wall 807 in the vicinity of the vent hole 808 in the lamp housing 802 so as to hold it, and positioned at a dowel 807a provided on the side wall 807.

In addition, a notched part 810 is provided in a part of the lamp housing 802 on the side of the vent hole 809 so as not to impede the flow of the cooling air. A power source plug 811 to supply the power to the lamp housing is provided on the side of the lamp housing.

In the embodiment, the light source lamp 801 is fixed to the lamp housing 802. When the light source lamp 801 is exchanged by removing the lamp exchange lid 27 (refer to FIG. 2) of the above-mentioned external case, the light source lamp is attached/detached together with the lamp housing 802.

4-2. Illumination Optical System

An illumination optical system 923 is provided with an assembly body of small lenses, and comprises integrator lenses 921,922 to split the light emitted from light source lamp unit 8 by the small lenses into a plurality of partial luminous fluxes, a polarizing conversion element 920 to convert the partial luminous flux which is the assembly of the beams of random polarizing direction into the beam of the same polarizing direction, and a superposing lens 930 to superpose each of the partial luminous fluxes converted in the beam of the same polarizing direction on the surface of the light valves 925R, 925G, 925B.

The polarizing conversion element 920 is provided with a polarizing beam splitter array 9201 and a selective retardation film 9202 as indicated in FIG. 7, and the polarizing beam splitter array 9201 is of the shape where a plurality of translucent plates 9203 of columnar shape of parallelogram section in the attached condition.

A polarizing separation layer 9204 and a reflection layer 9205 are alternately formed on the interface of the translucent plates 9203.

The polarizing beam splitter array 9201 is manufactured by sticking a plurality of plate glasses on which the polarizing separation layer 9204 and the reflection layer 9205 are alternately arranged, and diagonally cutting the plate glasses at the prescribed angle.

The partial luminous flux split by the integrator lenses 921,922 are split into the P-polarized light and the S-polarized light by the polarizing separation layer 9204, and the P-polarized light is converted into the S-polarized light by a λ/2 retardation layer 9206 to be selectively formed on the selective retardation film 9202 and emitted therefrom.

The S-polarized light is reflected by the polarizing separation layer 9204, and further reflected by the reflection layer 9205 and emitted as the S-polarized light as it is.

The luminous flux which is arranged into the S-polarized light is reflected by a reflection mirror 931 arranged at a corner part of the light guide 100, and transmitted to the color separation optical system 924.

Because the illumination optical system 923 is provided with the polarizing conversion element 920, the utilization efficiency of the light is improved compared with the case where the random polarized light in which the P-polarized light and the S-polarized light are mixed is utilized as it is, and further, the color separation property at dichroic mirrors 941,942 mentioned below can be improved. Because the S-polarized light is excellent in reflectivity compared with the P-polarized light, the S-polarized light is advantageous in that the loss of quantity of light, etc., can be controlled.

4-3. Color Separation Optical System and Modulation System

The color separation optical system 924 comprises a red and green reflecting dichroic mirror 941, a green reflecting dichroic mirror 942, and a reflection mirror 943 as indicated in FIG. 4(B).

The blue luminous flux B contained in the luminous flux emitted from the illumination optical system 923 passes through the red and green reflecting dichroic mirror 941, reflected by a rear reflection mirror 943 at right angles, and emitted from an emission part of the blue luminous flux toward the prism unit 910.

The red and green luminous fluxes R,G are reflected by the mirror 941, and only the green luminous flux G is reflected at right angles by the green reflecting dichroic mirror 942, and emitted from the green luminous flux emission part toward the color synthesis optical system.

The red luminous flux R passing through the mirror 942 is emitted from the red luminous flux emission part toward a light guide system 927.

Converging lenses 951,952 are arranged respectively on the emission side of the emission parts of the red luminous flux R and the green luminous flux G of the color separation optical system 924, and the luminous flux emitted from each emission part is set parallel by the converging lenses 951, 952.

4-4. Modulation System and Color Synthesis System

The parallel blue and green luminous fluxes B,G are incident on the light valves 925B, 925G to be modulated, and the image information corresponding to each color light is added thereto.

The light valves 925B, 925G are switching-controlled according to the image information by a driving means not indicated in the figure, and each color light passing therethrough is modulated thereby.

A known means can be used as-is for the driving means.

On the other hand, the red luminous flux R is guided to the corresponding light valve 925R through the light guide system 927, and similarly modulated according to the image information.

The light guide system 927 comprises an incidence side lens 974, an incidence side reflection mirror 971, an emission side reflection mirror 972, an intermediate lens 973 arranged therebetween, and a converging lens 953 arranged on the proximal side of the light valve 925B.

The length of the optical path from the light source lamp unit 8 to each of the light valves 925R, 925G, 925B is longest in the case of the red luminous flux R, and the loss caused by the light diffusion becomes maximum in the case of the red light. However, the loss of the red light can be controlled to a certain degree by arranging the light guide system 927.

The light valves 925R, 925G, 925B in the embodiment are liquid crystal light valves comprising a pair of polarizers and a liquid crystal panel arranged therebetween.

4-4. Color Synthesis Optical System

Each color luminous flux modulated through each of the light valves 925R, 925G, 925B is incident on the prism unit 910 to constitute the color synthesis optical system and re-synthesized here [in the prism unit 910].

The re-synthesized luminous flux is projected as the magnified color image on the screen at the prescribed position through the projection lens unit 6.

Thus, in the embodiment, the luminous flux emitted from the light source lamp unit 8 is reflected by the reflection mirror 931 in the light guide 100, advanced in the detouring L-shaped optical path along the L-shaped plane shape of the light guide 100, and reaches the color separation optical system 924 and the prism unit 910.

The optical path is set to a maximum though each part of the optical system is arranged in a narrow area. Thus, the luminous flux emitted from the light source lamp unit 8 can reach the light valves 925R, 925G, 925B as the parallel luminous flux while the arrangement and position of the integrator lenses 921,922 and the polarizing conversion element 920 are sufficiently secured using a lens of small F value.

Because the arrangement and position of the integrator lenses 921,922 can be secured sufficiently wide, the splitting number can thus be increased.

The integrator lenses 921,922 can be arranged in an optically affordable condition, and can be miniaturized as a result. In addition, because further telecentric illumination light can be obtained by providing the integrator lenses 921,922 of the same size, the converged image of each partial luminous flux formed on the polarizing separation layer 9204 of said polarizing conversion element 920 can be reduced in size, variance in the size of the converged image can be controlled, and the utilization efficiency of the illumination light can be improved.

5. Structure of Light Guide

The light source lamp unit 8 and all optical elements other than the projection lens unit 6 among the above-mentioned optical systems are held between the lower and upper light guides 901,902 of the shaped indicated in FIG. 8. The light source lamp unit 8 is stored in a light source lamp unit storage part 800 formed in the lower light guide 901.

The upper light guide 902 and the lower light guide 901 are integrated with the prism unit 910 and the projection lens unit 6 through a head plate 903 mentioned below, and fixed to the lower case 4 by fixing screws. Rectangular notches 9001,9002 are formed in a lower side of the lower light guide 901 and an upper side of the upper light guide 902 respectively to fix the prism unit 910 to the head plate 903.

An opening part 9004 to feed the cooling air to the light source lamp unit 8 is formed in a partition wall 9003 of the lower light guide 901 located in the vicinity of the light source lamp unit storage part 800.

Opening parts 907,908 to cool the illumination optical system 923 are formed in a side part and a bottom part of an area 900 in which the illumination optical system 923 of the optical unit 10 is stored.

An opening part 9021 is formed in an upper part of the upper light guide 902, and the opening part 9021 is communicated with the above-mentioned opening part 9004 through a duct 9028.

6. Structure of Head Plate

The prism unit 910 is fixed with a fixing screw to a face side (the proximal side in FIG. 9) of the thin head plate 903 which is a magnesium die cast plate as indicated in FIG. 9 and FIG. 10.

The head plate 903 basically comprises a vertical wall 91 extending in the width direction of the display in a vertical posture, and a bottom wall 92 which is extended horizontally from a lower end of the vertical wall 91 and supports the prism unit 910.

A rectangular opening 91b to pass the light emitted from the prism unit 910 is formed in a center part of the vertical wall 91. Four screw holes 91d to fix a base end side of the projection lens unit 6 are formed, and two dowels 91e for positioning are formed in the vertical wall 91. Supported parts 93 (only one part is indicated) to be supported by a pair of supporting parts 40 (refer to FIG. 3) provided on an inner surface side of the lower case 4 are provided on a part on each side of the opening 91b of the vertical wall 91.

Three communication holes 91g to be communicated with the lower side of the bottom wall are formed in a part corresponding to the mounting position of the prism unit 910 in the bottom wall 92, and a mounting part 91h of the prism unit 910 is formed over the communication holes 91g.

Screw holes 91c are formed in the mounting part 91h, and the prism unit 910 is fixed to the head plate 903 making use of the screw holes 91c.

Fixing surfaces 93 which are the supported parts to connect the head plate 903 respectively to the supporting parts 40 (refer to FIG. 3) as a pair of supporting parts provided on the inner surface side of the lower case 4 are provided on a part on each side of the opening 91b of the vertical wall 91. The fixing surfaces 93 are parallel to the bottom wall 92 and projected from the vertical wall 91, and supported by and fixed to a receiving surface 41 of the supporting parts 40 of the lower case 4. A boss 41b and a screw hole 41c are provided in the receiving surface 41 of the supporting part 40. The boss 41b is engaged in the hole 93b provided in the fixing surface 93, and screws are inserted in a screw hole 93c and a screw hole 93c to fix the fixing surface 93 to the supporting part 40. Though the fixing surface 93 is not necessarily fixed to the supporting part 40, a problem that the optical axis of the optical system is deviated by an impact or the like from the outside can be solved through fixing by screws.

A planar reinforcement rib 93a orthogonal to the fixing surface 93 is erected on the vertical wall 91, and the reinforcement rib 93a is integrated with the fixing surface 93.

The fixing surface 93 is provided in the height range H from the height position of an upper end to the height position of a lower end of the contour of the projection lens unit 6 of the vertical wall 91 as indicated in FIG. 11. More specifically, the fixing surface 93 is provided approximately at the same height position of the optical axis 6A of the projection lens unit 6 of the vertical wall 91. In other words, the height position of the fixing surface 93 is in the height range not less than $1/3$ to not more than $2/3$ from the lower end of said vertical wall 91 when the total height of the vertical wall 91 is assumed to be 1. The height position of the fixing surface 93 is more preferably the position not less than $2/3$ from the lower end of the vertical wall 91.

7. Cooling Structure of Each Component

In the projection display 1, the optical unit 10, the power source unit 7, the video substrate 11, and the driver substrate 13 are forcibly cooled by the above-mentioned air suction fans 24, 17 and the air discharge fan 16.

7-1. Air Suction from Air Inlet 240, and Cooling and Dust-proofing of Prism Unit 910 and Light Valves 925R, 925G, 925B As is seen from FIG. 5, the outside air is sucked from the air inlet 240 mainly by the air suction fan 24 provided on a lower part of the prism unit 910.

A part of the cooling air sucked from the air inlet 240 is fed as the cooling air for the prism unit 910 and the light valves 925R, 925G, 925B.

FIG. 12 is a partly sectioned view illustrating the detailed structure in the vicinity of the prism unit 910. FIG. 12 illustrates only the section of the light valve 925G.

Three light valves 925R, 925G, 925B are arranged in the vicinity of three light incident planes of the prism unit 910.

The light valves 925R, 925G, 925B in the embodiment are liquid crystal light valves comprising a pair of polarizers 962,963 and a liquid crystal panel 961. The liquid crystal panel 961 and the emission side polarizer 963 arranged on the light emission surface side thereof are fixed to the light incident plane of the prism unit 910. On the other hand, the incident side polarizer 962 arranged on the light incident surface side of the liquid crystal panel 961 is fixed to the surface of the liquid crystal panel 961 side of a metallic polarizer fixing plate 960. In the polarizer fixing plate 960, an opening of the sectional area slightly smaller than the sectional area of three light valves 925R, 925G, 925B is formed in a wall formed so as to surround the light incident planes of three light valves 925R, 925G, 925B. The incident side polarizer 962 is fixed by adhering its peripheral part to a peripheral part of the opening. The incident side polarizer fixing plate 960 of the incident side polarizer is fixed to the bottom wall 92 of the head plate 903. A flexible substrate 964 is connected to the liquid crystal panel 961. The flexible substrate 964 is held by a cushion material 9023 attached to a riser wall part 9022 provided on the upper light guide 902 and a prism duct 926. A tip of the flexible substrate 964 is connected to the connector formed on the substrate 13. (not indicated in the figure)

The head plate 903 on which the prism unit 920 and three light valves 925R, 925G, 925B are mounted is mounted on an upper part of the air inlet 240. An air filter 241 arranged to cover the air inlet 240 and a cushion material 242 arranged on a peripheral part are held by a rib 91f provided on the lower side of the head plate 903, and fixed thereto. The air suction fan 24 is arranged between the prism unit 920 and the air filter 241.

The light incidence/emission surfaces of the prism unit 910 are surrounded by the lower light guide 901 and the vertical wall 91 of the head plate 903. An upper part of the prism unit 910 is covered by the duct 926 comprising a metallic mesh 926a and a resin frame 926b.

A space 911 surrounded by the air inlet 240, the vertical wall 91 of the head plate 903, the lower light guide 901, and the duct 926 is formed in the vicinity of the prism unit 910, and a cooling passage from the air inlet 240 to the duct 926 is constituted by the space 911.

The cooling passage is explained in detail. The cooling air sucked from the air inlet 240 by the air suction fan 24 is passed through the communication holes 91g provided in the bottom wall 92 of the head plate 903 to cool the surfaces of the prism unit 910, the liquid crystal panel 961, and the incidence/emission side polarizers 962,963. The incidence/emission side polarizers 962,963 transmit only the prescribed polarized light component of the incident light, and absorbs the rest of the polarized light component. In particular, it is easy [for the incidence/emission side polarizers 962 and 963] to generate heat. The polarizer is relatively weak at the heat, and the liquid crystal panel is likely to be changed in the operation characteristics. Thus, the peripheral part of the liquid crystal panel is required to be specially cooled. In the embodiment, the incident side polarizer fixing plate 960 also works as the straightening plate, and the cooling air can be efficiently guided to the peripheral part of the liquid crystal panel by the incident side polarizer fixing plate. In addition, cooling of the incident side polarizer can be specially promoted by the heat radiation from the polarizer fixing plate if the polarizer fixing plate 960 is made of the material of high heat conductivity such as aluminum.

The dust-proof structure of the peripheral part of the prism unit 910 is explained.

When dust is adhered to the light valves 925R, 925G, 925B to form the image and the prism unit 910 to synthesize the image formed by the light valves, the shadow caused by dust or the like appears on the image (projected image) to be projected on the projection surface. It is thus preferable to prevent ingress of dust, etc. into the space 911 surrounded by the air inlet 240, the vertical wall 91 of the head plate 903, the lower light guide 901, and the duct 926 from the viewpoint of improving the quality of the projected image.

In the embodiment, the air filter 241 and the cushion material 242 are provided as dust-proof means, and ingress of dust, etc., from the air inlet 240 into the space 911 can be protected thereby. In addition, in the embodiment the duct 926 is provided as a dust-proof means, and reverse flow of the dust, etc., into the space 911 can be prevented thereby when the air suction fan 24 is stopped. Thus, in the projection display of the embodiment, ingress of dust, etc., into the space 911 is small, and the image of extremely excellent quality can be obtained.

7-2. Cooling of Circuit Substrates 11,13

The cooling air which cools the prism unit 910 and the light valves 925R, 925G, 925B is discharged from the duct 926, and guided to the upper part of the prism unit 910, and supplied as the cooling air for the video substrate 11 and the driver substrate 13 provided on the upper part of the optical unit 10 as indicated in FIG. 13 and FIG. 4(A). A notch 131 is formed in a part to cover the prism unit 910 of the driver substrate 13 arranged on the lower side so as distribute the cooling air along the laminated video substrate 11 and driver substrate 13 respectively.

The air to be distributed along the substrates 11,13 is guided toward the light source lamp unit 8 by the discharging force of the air discharge fan 16. (Route A1)

7-3. Cooling of Power Source Unit 7

A part of the cooling air sucked from the air inlet 240 is also used for cooling the power source unit 7 through the opening 91b in the head plate 903.

The cooling air discharged from said opening 91b is guided to the suction opening 75 provided on one end part of the power source unit 7 as indicated in FIG. 13 and FIG. 4(A). (Route A2)

As indicated in FIG. 4(A), the suction fan 17 is provided in the suction opening 75. The cooling air guided along the route A2 is forcibly sucked inside the power source unit 7 by the suction fan 17 to cool the primary side active filter, the power supply, the ballast, etc. in the power source unit 7.

The cooling air is then discharged from the discharge opening 77 (not indicated in FIG. 13) provided on the other end part of the power source unit 7 by the discharging force of the discharge fan 16. (Route A3)

7-4. Cooling of Illumination Optical System 923

Cooling of the illumination optical system 923 is further explained. As indicated in FIG. 8, the opening parts 907,908 are formed in the lower light guide 901. The illumination optical system 923 is cooled by sucking the air inside the display from the opening parts 907,908. The air in the display is forcibly discharged by the discharge fan 16 (refer to FIG. 4). The air in the display to be automatically taken into the opening parts 907,908 by the discharging force of the discharge fan 16 is used as the cooling air of the illumination optical system. The air after cooling the illumination optical system is guided to an opening part 9021 provided in the upper light guide 902 by the discharging force of the discharge fan 16, and discharged therefrom. (Route A4 indicated in FIG. 4(A) and FIG. 13.)

7-5. Cooling of Light Source Lamp Unit 8

The air after cooling the circuit substrates 11,13, the power source unit 7, and the illumination optical system 923 is used for cooling the light source lamp unit 8. The cooling route is explained referring to FIG. 4(A) and FIG. 6.

The air after cooling the video substrate 11 and the driver substrate 13 along the above-mentioned route A1 flows into the light source lamp unit 8 through an opening part 9004 (refer to FIG. 8) provided in the lower light guide 901. The air is guided along the surface on the opposite side to a reflecting surface 806a of the reflector 806 by the discharging force of the discharge fan 16, and cools it. Then, the air is discharged from a notched part 810 formed on the side of the lamp housing 802 by the discharging force of the discharge fan 16. (Route A5).

On the other hand, the air after cooling the power source unit 7 along the route A3 flows into the light source lamp unit 8 through the opening part 9004 (refer to FIG. 8) provided in the lower light guide 901. In addition, the air is guided along the reflecting surface of the reflector 806 through a vent port 808 formed in the lamp housing 802 and a vent port 803 formed in the reflector 806 to cool the lamp body 805. (Route A6). As previously described in the explanation part of the light source lamp unit 8 referring to FIG. 6, the straightening plate 841 is provided on an inlet of the vent port 808, and the air flowing direction is changed thereby. The cooling air is guided so as to directly impact against the lamp body 805. Thus, the lamp body 805 which is the largest heat generation source in the display can be efficiently cooled.

In addition, the air after cooling the illumination optical system 923 along the route A4 is discharged from the opening part 9021 indicated in FIG. 8, and then, guided to the opening part 9004 by the duct 9028, and flows into the light source lamp unit 8 therethrough. The air cools the lamp body 805 along the route A6.

The air after cooling the lamp body 805 along the route A6 passes through the vent port 804 formed in the reflector 806 by the discharging force of the discharge fan 16, and is discharged from the vent port 809 formed in the lamp housing 802. (Route A6).

7-6. Air Discharge Structure

The air discharged from the light source lamp unit 8 is discharged from the discharge port 160 by the discharge fan 16 as indicated in FIG. 4.

As is seen from FIG. 5 (A), a light shielding plate 161 as a light shielding means to shield the light leaking from the discharge port is provided on the inner side of the discharge port 160.

The light shielding plate 161 is of the louver shape in which two plate-shaped member across the discharge port 160 are partially overlapped though its detailed structure is not indicated in the figure, and the overlapped part of two members is arranged corresponding to the notched part 810 in the lamp reflector 806. Because the air is discharged from a gap part between two plate-shaped members, the air discharge is not impeded.

8. Temperature Monitoring

The temperature of the above-mentioned light source lamp unit 8 and three light valves 925R, 925G, 925B is monitored making use of an internal temperature detecting means S1 provided on an upper part of the light source lamp unit 8, an internal temperature detecting means S2 provided on the video substrate 11 above the prism unit 910, and an external temperature detecting means S3 provided in the vicinity of the suction opening 75 of the power source unit 7. The temperature is monitored to prevent excessive temperature rise of the light source lamp unit 8 and the light valves 925R, 925G, 925B which are relatively weak in heat.

The internal temperature detecting means S1 detects the temperature of the light source lamp unit 8 and is operated singly. When peculiar temperature rise is detected in the light source lamp unit 8 while the projection display 1 is in use, an alarm sound is given (the alarm temperature), and when the temperature rise is not stopped, and the abnormal condition is further continued, the lamp body 805 is turned off (abnormal temperature).

The external temperature detecting means S3 detects the temperature in the vicinity of the suction opening 75 of the power source unit 7, and detects the temperature of the cooling air entering from the gap between the external case 2 and the projection lens unit 6, and the temperature of the cooling air entering from the above-mentioned opening 91b. The external temperature detecting means S3 is provided at this position taking into consideration the point where the temperature of the cooling air is approximately equal to the outside air temperature.

The internal temperature detecting means S2 is provided to detect the temperature rise of the light valves 925R, 925G, 925B by detecting the temperature of the cooling air after cooling three light valves 925R, 925G, 925B and the prism unit 910. The temperature rise of the light valves 925R, 925G, 925B is detected by the temperature of the cooling air after cooling because the actual temperature of the light valves 925R, 925G, 925B can not be measured by a contact type temperature sensor in the practical condition of use.

Cooling control of the light valves 925R, 925G, 925B is performed by the difference Δt of the temperature to be detected by the above-mentioned internal temperature detecting means S2 and the external temperature detecting means S3. Cooling control is defined as the control of the blowing quantity of the fans provided in the display such as the discharge fan 16 and the suction fan 24, the control to turn off the lamp body 805 of the light source lamp unit 8 with large heat generation, etc. Cooling control of the light valves 925R, 925G, 925B is performed according to the difference of the temperature to be detected by the internal temperature detecting means S2 and the external temperature detecting means S3 taking into consideration that the difference between the actual temperature of the light valves 925R, 925G, 925B and the temperature detected by the internal temperature detecting means S2 is changed by the external temperature.

More specifically, the temperature is controlled using the lower limit graph G1 for the alarm temperature and the lower limit graph G2 for the abnormal temperature, and when the temperature is in the area below the graph G1, it means that the temperature of the light valves 925R, 925G, 925B is in the normal condition. When the temperature lies in the area between the graph G1 and the graph G2, an alarm is given by a buzzer, and when the temperature is in the area above the graph G2, the light valves 925R, 925G, 925B are in an abnormal condition and the lamp body 805 of the light source lamp unit 8 is turned off.

The formulas of the graph G1 and the graph G2 are derived by the following formulas.

Graph $G1$: $\Delta t(°C.)=A \times$ outside temperature $(°C.)+B(°C.)$

Graph $G2$: $\Delta t(°C.)=C \times$ outside temperature $(°C.)+D(°C.)$

The specific numerical values including intercepts B,D with the Y-axis, and inclinations A,C are different depending on the structure and arrangement of the projection display 1, and obtained from the following procedure.

(1) When the external temperature, i.e., the temperature to be detected by the external temperature detecting means S3 is 0° C., when the temperature D of the cooling air to be detected by the internal temperature detecting means S2 when the temperature of the light valves reaches the limit of the practical temperature, and the temperature B of the cooling air to be detected by the internal temperature detecting means S2 when the temperature reaches the temperature where the temperature of the light valves reaches the temperature of giving an alarm are measured. The intercepts B,D with the Y-axis of the graphs G1,G2 are obtained by the measurement.

(2) When the prescribed external temperature, i.e., the temperature to be detected by the internal temperature detecting means S3 is T° C., the temperature T2,T1 of the cooling air to be detected by the internal temperature detecting means S2 when the temperature of the light valves reaches the limit of the operating temperature and when the temperature of the light valves reaches the temperature of giving an alarm are measured. Further, the value D1 (=T2−T) of Δt when the temperature of the light valves reaches the limit of the practical temperature, and the value B1 (=T1−T) of Δt when the temperature of the light valves reaches the temperature of giving an alarm.

(3) The inclination A,C of the graphs G1,G2 are calculated from the values obtained following the procedures (1) and (2).

9. Advantages of Embodiments

In the projection display 1 related to said embodiment, the cooling air sucked from the air inlet 240 is efficiently circulated as explained below, various parts are arranged at high density, and the cooling efficiency can be improved while the display is miniaturized.

Because the air inlet 240 is formed below the prism unit 910, the cooling air to be sucked from the outside first cools the prism unit 910 and the light valves 925R, 925G, 925B. The space 911 surrounded by the air inlet 240, the vertical wall 91 of the head plate 903, the lower light guide 901, and the duct 926 is formed around the prism unit 910, and the cooling air can be guided to the upper part without any leakage. Because the light valves 925R, 925G, 925B which constitute the modulation system are arranged in the space 911, no separate cooling mechanism to cool the light valves 925R, 925G, 925B is required to be provided, and the cooling mechanism can be simplified thereby.

The cooling air after cooling the above-mentioned parts, is distributed along hotter circuit substrates 11,13 and cools the substrates.

The power source unit 7 is provided with the suction opening 75 and the discharge opening 77, and the inside can be efficiently cooled independently from other parts. Because the suction opening 75 of the power source unit 7 is provided with the suction fan 17, the heat sink in the power source unit 7 can be forcibly cooled, and the cooling efficiency of each element in the power source unit 7 can be further improved.

In addition, the illumination optical system 923 can be cooled by the opening parts 907,908 formed in the light guide 100.

Because the light source lamp unit 8 is arranged closest to the discharge port 160, the cooling air for the prism unit 910, the light valves 925R, 925G, 925B, the circuit substrates 11,13, the inside of the power source unit 7, and the illumination optical system 923 can also be used for cooling the light source lamp unit 8. The lamp housing 802 to constitute the light source lamp unit 8 is provided with the vent holes 808,809, and the vent holes 803,804 are formed in the right and left sides of the reflector 806. Because the cooling air is fed to the lamp body 805 through the vent holes 808,809,803,804, the cooling efficiency of the light source lamp unit 8 is promoted. The cooling efficiency can be further improved by the straightening plate 820 provided on the inlet of the vent hole 808.

In the projection display 1 of the embodiment, at least the prism unit 910, the power source unit 7 and the light source lamp unit 8 can be cooled with the cooling air sucked from the air inlet 240, and each parts can be efficiently cooled even when each part is arranged in a narrow area.

Because the prism unit 910, the light valves 925R, 925G, 925B, the circuit substrates 11,13, the power source unit 7, the illumination optical system 923, and the light source lamp unit 8 are successively cooled in the order of the part of relatively low temperature, the cooling efficiency can be further improved.

In addition, in the projection display 1 of the embodiment, the discharge port 160 is provided on a rear end part of the display, and the air is not discharged from a side part of the display at which a user is located. Thus, no hot air is hit against the user, and the light leaking from the inside of the display is difficult to get into the eyes, improving the convenience.

Because the light shielding plate 161 is provided on the inner side of the discharge port 160 formed in the vicinity of the light source lamp unit 8, leaking from the discharge port 160 during the use can be prevented. In addition, the light shielding plate 161 is of the louver type, and does not impede the air discharge from the discharge port 160.

Cooling control of the light valves 925R, 925G, 925B is performed according to the difference between the temperature to be detected by the internal temperature detecting means S2 and that by the external temperature detecting means S3, i.e., the temperature difference between the external temperature and the internal temperature, and appropriate cooling control can be performed.

Because the fixing surface 93 of the head plate 903 is provided in an area within the height range H of the contour of the projection lens unit 6 of the vertical wall 91, the center of gravity of the projection lens unit 6 can be as high as the fixing surface 93, or the fixing surface 93 can be higher than the center of gravity, the bending stress generated at the root of the vertical wall 91 can be efficiently mitigated by the projection lens unit 6, and deflection or breakage of the vertical wall 91 can surely be prevented.

Because no complicated reinforcement structure need be provided on the vertical wall 91, the structure of the head plate 903 can be simplified, the projection lens unit 6 and the prism unit 910 can be correctly positioned, and deviation of the optical axis can surely be prevented.

The fixing surface 93 provided approximately as high as the optical axis 6A of the projection lens unit 6 of the vertical wall 91 is projected on said vertical wall 91, and the vertical wall 91 can also be used as the reinforcement rib to reinforce the vertical wall 91. Because the reinforcement rib 93a orthogonal to the fixing surface 93 is erected on the vertical wall 91, rigidity of the vertical wall 91 can be further improved by the reinforcement rib 93a and the fixing surface 93 with simple structure. Because the prism unit 910 and the projection lens unit 6 are fixed in an aligned manner with each other across the vertical wall 91 with excellent rigidity, with the advantage that possibility of generating the positional deviation, i.e., the deviation of the optical axis is extremely small even when an impact or the like is applied.

In addition, the head plate 903 is made of a magnesium formed body, and its specific gravity can be reduced, and the weight of the head plate 903 is reduced, i.e., the weight of the display 1 is reduced, and excellent moldability can be obtained. Because the magnesium formed body is excellent in heat radiation, the high temperature of the prism unit 910 which is easy to generate the heat can be prevented by mounting the prism unit 910 on the head plate 903 made of the magnesium formed body, and supporting the head plate by the light guides 901,902.

The present invention is not limited to the above-mentioned embodiment, but includes the modification as shown below.

In the above-mentioned embodiment, the power source unit 7 is cooled by sucking the air entering from the air inlet 240 and the air entering from the gap between the projection lens unit 6 and the external case 2 through the suction opening 75, but similar effect to that of the above-mentioned embodiment can be enjoyed even by either suction.

Though the power source unit 7 is provided with the suction fan 17 to forcibly suck the cooling air, the cooling air may be distributed in the power source unit 7 making use of the discharging force of the discharge fan 16 provided in the discharge port 160, and furthermore, the suction fan may be provided in the discharge opening 77 to forcibly distribute the cooling air.

In the above-mentioned embodiment, the supported parts comprise the fixing surface 93 projected from the vertical wall 91 parallel to the bottom wall 92, and without being limited thereto, for example, the supported parts are extended from an end part in the width direction of the vertical wall parallel to said vertical wall, and fixed by screws in the horizontal direction relative to the lower case, or the supported parts may be a part of the vertical wall, and the vertical wall may be directly fixed by screws to the lower case. In short, the shape or the like of the supported parts is arbitrary so long as the height position of the supported parts to be connected to the lower case is within the height range from the upper end to the lower end of the contour of the projection lens unit.

Furthermore, cooling control according to the difference between the external temperature and the internal temperature can be applied not only to the light valves 925R, 925G, 925B but also to the whole cooling control in the display.

The specific structure and shape in the embodiment of the present invention may be of other design in a range where the purpose of the present invention can be achieved.

In the above-mentioned present invention, in the projection display in which the optical unit and the power source unit are stored, the power source unit is provided with the suction opening and the discharge opening, the inside of the power source unit can be efficiently cooled independently from other parts, the display can be niniaturized by closely arranging the optical unit and the power source unit to each other, and the inside of the display can be efficiently cooled.

Because the center of gravity of the projection lens unit is approximately as high as the supported parts, or the fixing part can be higher than the center of gravity by provided the supported parts to connect the head plate to the light guide in an area in the height range from the upper end to the lower end of the contour of the projection lens unit of the vertical wall, the weight of the projection lens unit can be efficiently dispersed to the light guide, and deflection of the vertical wall can be surely prevented. Thus, no complicated reinforcement structure need be provided on the vertical wall, the structure of the head plate can be simplified, the projection lens unit and the color synthesis optical system can be correctly positioned through the vertical wall, and deviation of the optical axis can surely be prevented.

Industrial Applicability

The present invention can be used as a projection display to optically process the luminous flux emitted from the light source and project the magnified image on a projection surface, for example, utilized as a video projector provided with a liquid crystal light valve.

What is claimed is:

1. A projector provided with an optical system which optically processes luminous flux emitted from a light source and projects the magnified image on a projection surface by a projection lens, said projector comprising:

a power source that supplies power to the optical system, an external case that houses said light source, said optical system and said power source, said optical system being provided with a color separation optical system to separate said luminous flux into a plurality of color luminous fluxes, a modulation system that modulates each of said separated luminous fluxes based on image information and emits the luminous flux as the modulated luminous flux, and a color synthesis optical system that synthesizes each of said modulated luminous fluxes and emits the synthesized luminous flux to said projection lens, said projection lens and said color synthesis optical system being mounted on a head plate, said head plate having a vertical wall, a support part that supports said head plate being provided in said external case, said projection lens having a base end side, said base end side of said projection lens being fixed to said vertical wall of said head plate, a bottom wall extended in the horizontal direction from a lower end part of the vertical wall, said bottom wall supports said color synthesis optical system, and a supported part supported by said support part provided in said external case, said supported part provided on said vertical wall within the height range from an upper end to a lower end of a contour of said projection lens on the vertical wall.

2. The projector according to claim 1, said projection lens having an optical axis, wherein said supported part is provided approximately at the same height position as that of said optical axis of said projection lens on said vertical wall.

3. The projector according to claim 1, wherein said supported part includes a fixing surface which is parallel to said bottom wall, said fixing surface projected from said vertical wall and supported by and fixed to said support part, and wherein a reinforcement rib orthogonal to the fixing surface is positioned on said vertical wall.

4. The projector according to claim 1, wherein said head plate is made of a magnesium formed body.

* * * * *